(12) United States Patent
Kuwayama et al.

(10) Patent No.: US 7,620,506 B2
(45) Date of Patent: Nov. 17, 2009

(54) MEASUREMENT ELECTRONIC DEVICE SYSTEM

(75) Inventors: Kenji Kuwayama, Tokorozawa (JP); Akio Segawa, Tokorozawa (JP)

(73) Assignee: Citizen Holdings Co., Ltd., Tokyo (JP)

( * ) Notice: Subject to any disclaimer, the term of this patent is extended or adjusted under 35 U.S.C. 154(b) by 0 days.

(21) Appl. No.: 10/532,810

(22) PCT Filed: Oct. 24, 2003

(86) PCT No.: PCT/JP03/13662

§ 371 (c)(1), (2), (4) Date: Apr. 26, 2005

(87) PCT Pub. No.: WO2004/038340

PCT Pub. Date: May 6, 2004

(65) Prior Publication Data

US 2006/0041394 A1 Feb. 23, 2006

(30) Foreign Application Priority Data

Oct. 27, 2002 (JP) .............................. 2002-350487

(51) Int. Cl.
*G01R 15/00* (2006.01)
(52) U.S. Cl. ............................................. 702/57; 700/3
(58) Field of Classification Search .................. 702/57, 702/80, 122, 188–190; 700/3, 8–9, 11; 711/219–220
See application file for complete search history.

(56) References Cited

U.S. PATENT DOCUMENTS

| 3,881,166 | A | | 4/1975 | Fort et al. | |
|---|---|---|---|---|---|
| 5,699,051 | A | * | 12/1997 | Billig et al. | 340/657 |
| 6,108,618 | A | * | 8/2000 | Fujii et al. | 702/189 |
| 6,263,380 | B1 | * | 7/2001 | Tsuboi et al. | 710/4 |
| 6,516,440 | B1 | * | 2/2003 | Teradaira | 714/763 |
| 6,956,339 | B1 | * | 10/2005 | Kureck et al. | 318/85 |
| 7,051,143 | B2 | * | 5/2006 | White et al. | 710/305 |
| 7,099,719 | B2 | * | 8/2006 | Weinhofer et al. | 700/17 |

FOREIGN PATENT DOCUMENTS

GB    2 202 655 A    9/1988

(Continued)

OTHER PUBLICATIONS

Japanese Notification of Reason(s) for Refusal dated Oct. 28, 2008, Application No. 2004-546480.
European Search Report dated Nov. 22, 2007, Application No. 03758900.9-1236.

*Primary Examiner*—Eliseo Ramos Feliciano
*Assistant Examiner*—Mary C Baran
(74) *Attorney, Agent, or Firm*—Westerman, Hattori, Daniels & Adrian, LLP.

(57) ABSTRACT

A plurality of measurement electronic device units (10, 20) each having a measurement detector connected thereto and thus having a measuring function are connected in series by connectors to be capable of mutually conveying measurement data and signals, and one (10) of the plural measurement electronic device units serves as a parent device having a function of transmitting/receiving measurement data and signals to/from an external device (5). Each of the control parts (21, 22) of the plural measurement electronic device units (10, 20) has a memory storing a measured value, and the parent device sends a measured value save command to a trigger line (44) in response to a request from the external device (5) so that the measurement electronic device units including the own unit are caused to simultaneously save measured values in the control parts (21, 22).

20 Claims, 17 Drawing Sheets

FOREIGN PATENT DOCUMENTS

| | | |
|---|---|---|
| JP | 7-177298 | 7/1995 |
| JP | 07-177298 A | 7/1995 |
| JP | 09-064712 A | 3/1997 |
| JP | 11-272204 | 10/1999 |
| JP | 11-272847 A | 10/1999 |
| JP | 2000-276495 A | 10/2000 |
| JP | 2002-22847 | 1/2002 |
| JP | 2002-22847 A | 1/2002 |
| JP | 2002-260770 A | 9/2002 |
| WO | WO 00/70579 | 11/2000 |

* cited by examiner

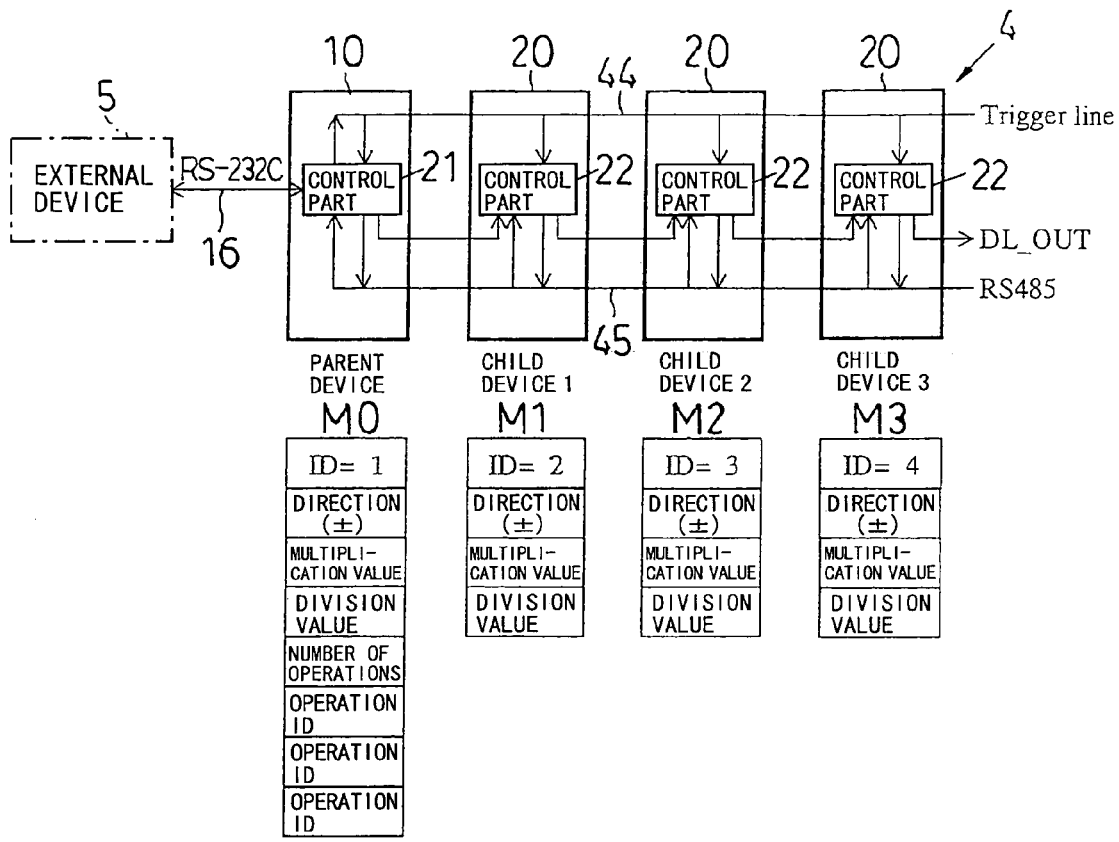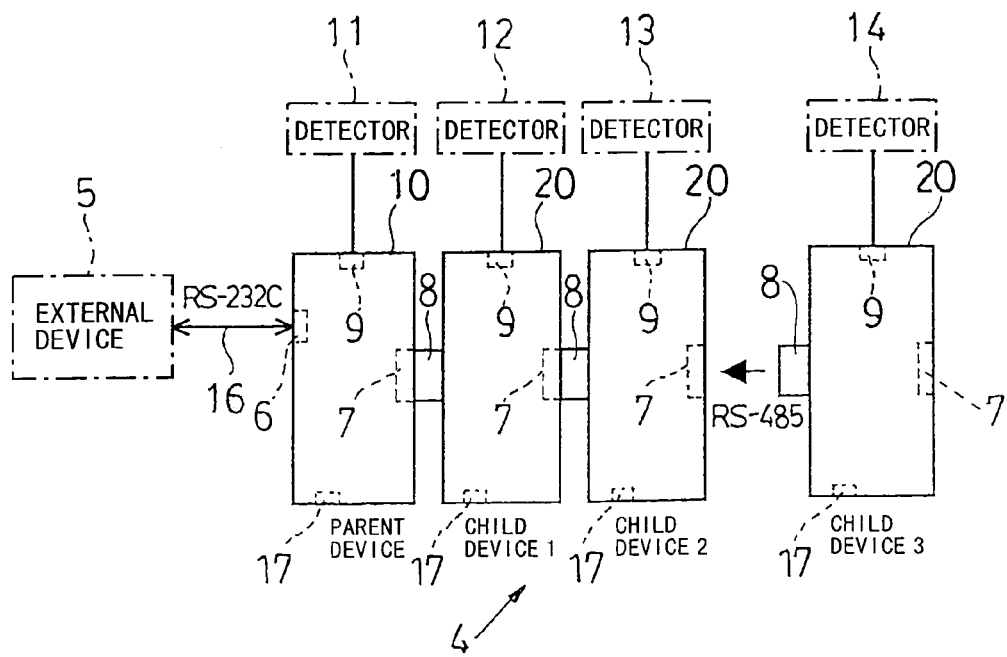

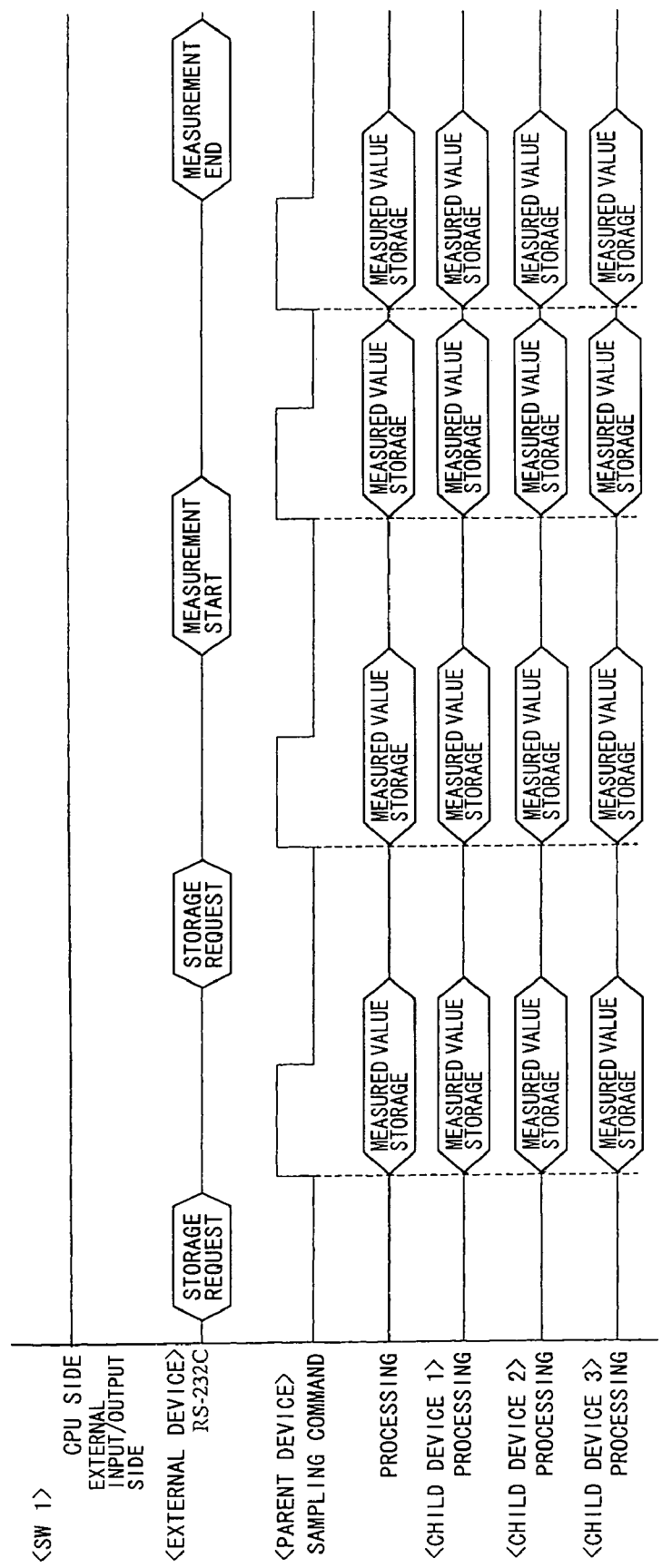
F I G. 7

F I G. 1 7
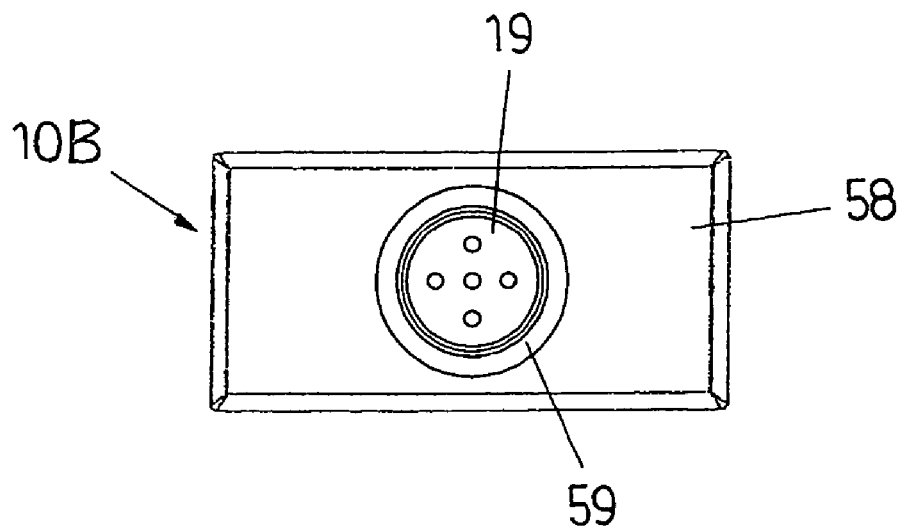
F I G. 1 8
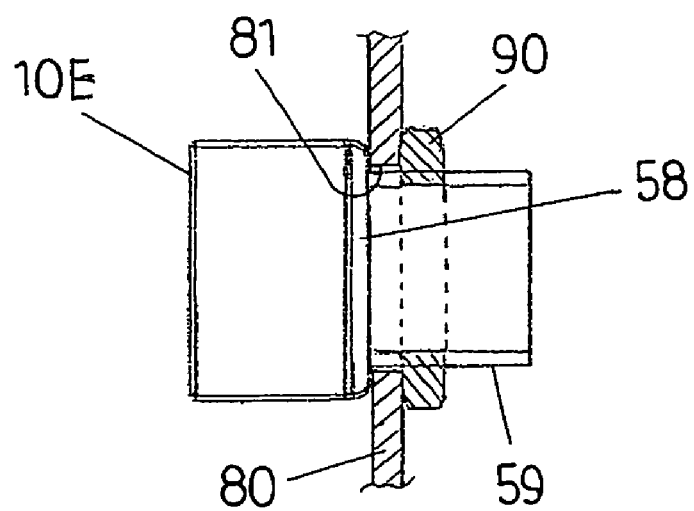

MEASUREMENT ELECTRONIC DEVICE SYSTEM

TECHNICAL FIELD

The invention relates to a measurement electronic device system comprising: a measurement electronic device unit (parent device) capable of transmitting/receiving data to/from an external device; and a plurality of measurement electronic device units (child devices) connected in series to the parent device.

BACKGROUND TECHNOLOGY

In order to obtain desired measurement data, widely practiced is a method in which a plurality of measurement electronic device units each having a measurement detector connected thereto and thus having a measurement function are used, and a common control device (a controller, a personal computer, or the like) controls these units to collect and process the measurement results by the respective measurement electronic device units.

In order to measure, for example, the shape of a camshaft being an engine part of an automobile, it is necessary to measure displacements of respective cams provided in the camshaft at each rotation angle.

A conventional method for this is such that, as shown in FIG. 20, probes of detectors 111 to 114 connected to a plurality of measurement electronic device units 101 to 104 respectively are individually set in contact with cam surfaces of respective cams 121 to 124 of a camshaft 120, and the detectors 111 to 114 are fixed on a line parallel to and a predetermined distance apart from the axis of the camshaft 120.

The displacement measurement is performed in such a manner that a pulse signal generated every time the camshaft 120 rotates by a predetermined angle is inputted to a controller 150 from an encoder 140 attached to a motor 130 for rotating the camshaft 120 and measured values detected by the respective measurement electronic device units 101 to 104 are individually inputted to the controller 150, so that the controller 150 stores the measured values (position data) on the respective cams 121 to 124 obtained every time the camshaft 120 rotates by the predetermined rotation angle to examine changes thereof.

In this case, however, simultaneity is reduced due to time lag between the measurement electronic device units 101 to 104 and the controller 150 and due to time lag that is caused because the controller 150 sequentially reads the values measured by the measurement electronic device units 101 to 104, as is generally practiced.

A specialized circuit has to be provided in order to allow the controller 150 to simultaneously read the values measured by all the measurement electronic device units 101 to 104, which poses problems that the system becomes complicated and expensive.

Here, as another method, available is a method in which the controller 150 issues a temporary save command of measurement data to all the measurement electronic device units 101 to 104 to prevent the measurement data from changing, and thereafter reads the measurement data in sequence.

This method, however, has a problem that the rotation speed of the camshaft 120 is not allowed to be high and thus it is not possible to speed up the measurement time.

Further, for example, in confirming if the thickness of a rolled iron plate falls within a prescribed value range by measuring the thickness of the iron plate at predetermined time intervals, since it is difficult to set a reference value for the measurement, the thickness is generally measured in such a manner that two detectors facing each other are disposed to sandwich the iron plate, and the sum of the measured values of the two detectors is calculated.

In this case, because the iron plate is continuously rolled, the measured values incessantly change. Moreover, since the rolled iron plate moves up and down, each of the measured values of the two detectors, if individually seen, often presents a larger change than the change of the plate thickness.

Thus, when a measured object is moving, it is important that the measured values of the two detectors are simultaneously measure values, and if their measurements are not simultaneous, the measured values become more unreliable.

Thus, in obtaining a desired measurement result by performing an arithmetic operation on measured values by a plurality of detectors, for ensuring higher reliability of the measurement result, it is very important that the measurements by the plural detectors are simultaneous and there is no time lag therebetween.

However, in a system in which an external device such as a personal computer reads values measured by two measurement electronic device units to calculate the sum thereof, a read operation of the measured value is performed twice, and time lag therebetween deteriorates reliability of the measured values.

In another example where the inclinations of two pins standing on one iron plate in an assembly product are to be measured, two measuring instruments are used for one pin and a difference between measured values thereof is calculated. Therefore, two sets of the two measuring instruments are provided. The two sets are individually positioned through zero resetting or the like by a positioning jig serving as a master.

For automating this, a zero reset signal is inputted from an external device, and the external device is generally connected to each of all the electronic device units by individual wiring. This poses a problem that the wiring becomes complicated.

If another method is used in which the electronic device units are mechanically and electrically connected to one another and an input signal such as a zero reset signal is routed through the wiring among them, the wiring is simplified, but in the aforesaid example where the inclinations of the two pins are measured, simultaneous zero resetting of the two measuring instruments for one pin is required. On the other hand, as for zero resetting of the two sets of the measuring instruments, separate zero resetting offers higher operability. Therefore, it is desirable that a command for zero resetting can be given separately to each set of several measuring instruments.

In some cases, addition/subtraction is performed on measured values of two measuring instruments as in the aforesaid example where the thickness of the iron plate is to be measured and in the aforesaid example where the inclinations of the two pins are to be measured, and in some other cases where an average height of a plane or an average outside diameter of a disk-shaped part is to be obtained, addition/subtraction is performed on measured values of three or more measuring instruments, and division is further performed thereon. In still other cases where a measured value is magnified/reduced using a lever mechanism, multiplication is performed on one measured value.

These arithmetic operations are generally performed by an operator reading displayed measured values of individual measurement instruments or by an external device performing an arithmetic operation on individual measured values.

However, reading the measured values by an operator has not only a problem of complicating the work but also a problem of operation mistakes that the operator might make. The arithmetic operation by the external device results in a heavy load on the external device, and also results in poor operability especially in maintenance work since the operation result cannot be visually confirmed.

DISCLOSURE OF THE INVENTION

The present invention was made to solve the above-described problems, and an object thereof is to enhance simultaneity of measurements by a plurality of measurement electronic device units so that a highly reliable measurement result can be obtained.

It is another object to enable, in measurement using a plurality of sets of measurement electronic device units, easy positioning through zero resetting and easy and mistake-free arithmetic processing on respective measured values simultaneously measured by a plurality of measuring instruments.

In order to achieve the objects stated above, a measurement electronic device system according to the invention includes: a plurality of measurement electronic device units each having a measurement detector connected thereto and having a measuring function, the plural measurement electronic device units being connected in series by connectors to be capable of mutually conveying measurement data and signals, and one of the plural measurement electronic device units serving as a parent device having a function of transmitting/receiving measurement data and signals to/from an external device.

Each of the plural measurement electronic device units has a memory storing a measured value, and the parent device has a means for issuing a measured value save command to the plural measurement electronic device units including the own unit, in response to a request from the external device, to thereby cause the plural measurement electronic device units to simultaneously save measured values by the respective detectors in the memories.

Preferably, the measurement electronic device unit as the parent device has a means for causing all the measurement electronic device units including the own unit which are connected in series to save the measured values by the respective detectors in the memories, also in response to an externally supplied measured value save command.

In this case, preferably, the measurement electronic device unit as the parent device has a means for selectively changing connection of a signal line connected to the other measurement electronic device units to one of a signal line from an external device and a signal line of an internal output.

Each of the measurement electronic device units except the parent device may have a means for disconnecting mutually coupled signal lines to change connection to a signal line from an external part.

In any one of these measurement electronic device systems, preferably, each of the plural measurement electronic device units includes: a storing means for storing an operation parameter; and an arithmetic means for performing an arithmetic operation on the measured value saved in the memory, based on the parameter stored in the storing means.

In this case, preferably, the measurement electronic device unit as the parent device further includes a sum calculating means for calculating a sum of individual operation results calculated by the arithmetic means in the measurement electronic device units designated out of the plural measurement electronic device units.

In any one of these measurement electronic device systems, preferably, each of the plural measurement electronic device units is constituted of: a main body housing the connector for mutual series connection and the aforesaid respective means; and a display unit attachable/detachable to/from the main body, the display unit including: a display displaying the measured value and the parameter; and operation keys, and the main body and the display unit including connectors that directly connect the main body and the display unit mechanically and electrically when the display unit is attached to the main body and that allow the main body and the display unit to be electrically connected via a connecting line when the display unit is detached from the main body.

BRIEF DESCRIPTION OF DRAWINGS

FIG. 1 is a diagram showing a basic configuration of a connection state of measurement electronic device units in a measurement electronic device system shown in FIG. 2, and an example of operation parameters stored in the units;

FIG. 2 is a schematic block diagram of one embodiment of the measurement electronic device system according to the invention;

FIG. 7 is a timing chart showing a sampling operation by a measurement electronic device system constituted of the parent device and three child devices shown in FIG. 6, when the sampling operation is performed in response to a command from an external device interface 60 of the parent device;

FIG. 17 is a rear view of the same showing a state in which a fixing attachment is fixed to a rear face of the display unit;

FIG. 18 is a side sectional view of the support board and a nut when the display unit is similarly attached to the support board;

BEST MODE FOR CARRYING OUT THE INVENTION

Figure 3:
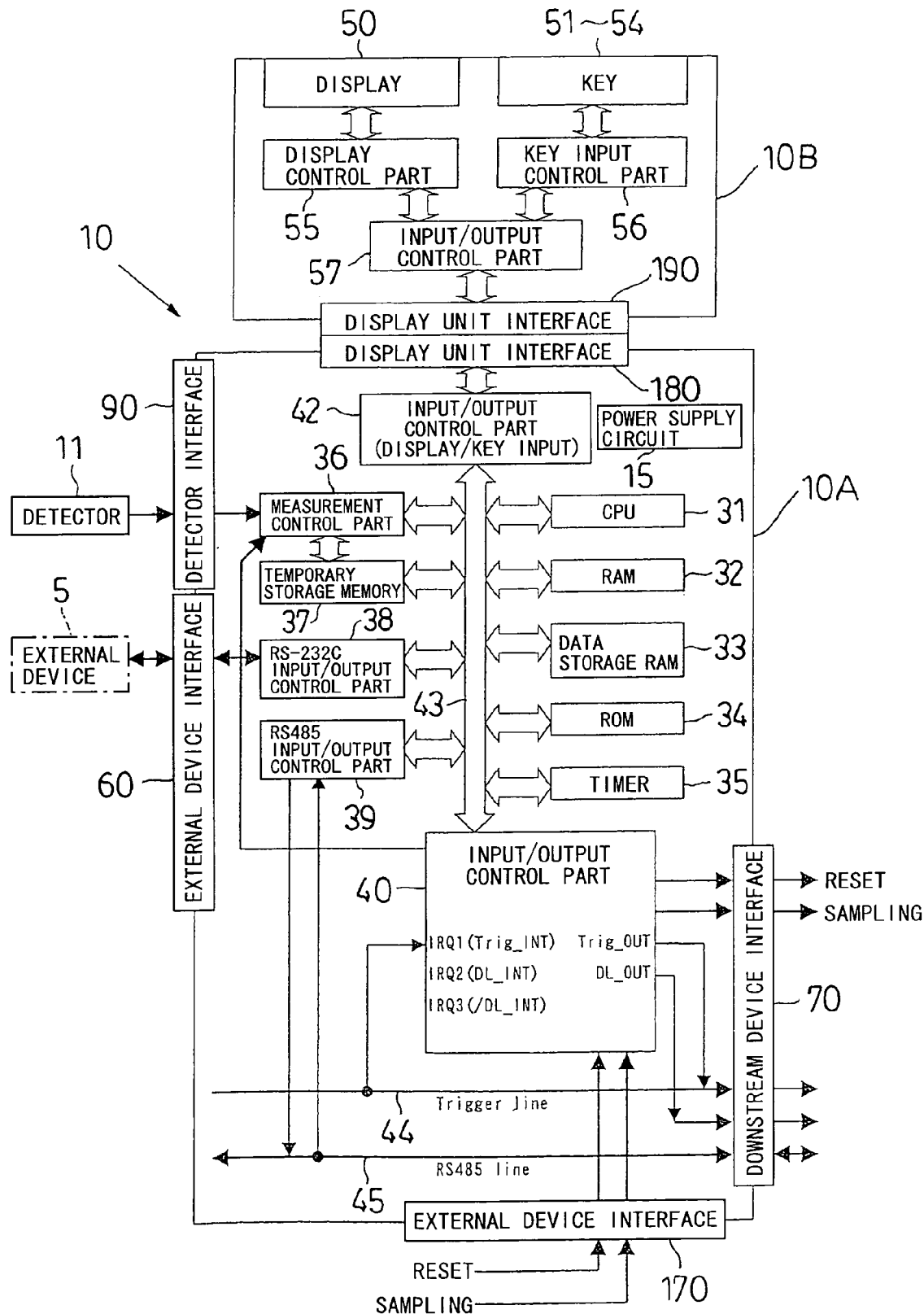
FIG. 3 is a block diagram showing an internal configuration of a measurement electronic device unit 10 as a parent device in FIG. 2.

Preferred embodiments of the invention will be described with reference to the accompanying drawings for more detailed description of the invention.

First, a schematic configuration of one embodiment of a measurement electronic device system according to the invention will be described with reference to FIG. 2.

This measurement electronic device system is comprised of four measurement electronic device units. Among them, a measurement electronic device unit 10 is a parent device which includes: a female connector (for external device interface) 6 for connection to an external device 5 having a data processing function; and a female connector (for downstream device interface) 7 for connection to the other electronic device unit (child device) and thus has a function of transmitting/receiving data and signals to/from the external device 5.

The other measurement electronic device units 20 are child devices, each including two connectors for connection to the other measurement electronic device units. In this example, a male connector (for upstream device interface) 8 is provided on one of two parallel faces whose area is larger than that of the other faces of a thin rectangular case, and a female connector (for downstream device interface) 7 is provided on the other of the two faces.

The three measurement electronic device units 20 as the child devices are mechanically and electrically connected in series to the measurement electronic device unit 10 as the parent device in sequence by fitting of the connectors 7 and 8, thereby constituting a measurement electronic device system 4.

For using this measurement electronic device system 4, an external device such as a personal computer or a controller is connected to the female connector 6 of the measurement electronic device unit 1 as the parent device by an RS-232C interface cable 16, and detectors 11 to 14 are connected to connectors (for detector interface) 9 provided on side faces of the measurement electronic device units 10, 20. The detectors 11 to 14 can be detectors for displacement measurement similar to the aforesaid detectors 111 to 114 shown in FIG. 20, but other detectors of various kinds for detecting voltage, resistance, temperature, pressure, light intensity, sound volume, distortion amount, or the like can be connected.

Each of the measurement electronic device units 10, 20 includes a circuit and so on adapted to the detector connected thereto, and the detectors of the three measurement electronic device units 20 have completely the same structure here, though detectors of different kinds may be connected to the respective measurement electronic device units.

Out of the measurement electronic device units constituting this measurement electronic device system 4, the measurement electronic device unit 10 as the parent device is capable of transmitting/receiving measurement data directly to/from the external device 5, and the measurement electronic device units 20 as the child devices are capable of transmitting/receiving measurement data to/from the external device 5 via the parent device or via the parent device and the other child device(s).

Power is supplied to the measurement electronic device unit 10 as the parent device from the external device 5 via a power cable and this power is then supplied to all the measurement electronic device units 20 as the child devices via power pins in the connectors 7, 8 and power lines in the child devices.

Incidentally, in order for the external device 5 to transmit/receive data to/from the measurement electronic device units 10, 20, it is necessary to set identification codes (IDs) for the respective electronic device units so that the external device 5 can discriminate to which of the measurement electronic device units the data is to be transmitted or from which of the measurement electronic device units the data has been received.

Methods generally practiced for setting such IDs for the plural electronic device units are a method of manually setting the IDs by using a hardware setting means such as a DIP switch provided in each of the electronic device units, a method of setting the IDs by a software means through operator's key input, and the like.

In the measurement electronic device system according to the invention, such conventional methods may be used for setting the IDs for the respective measurement electronic device units, but the IDs can also be automatically set in such a manner that the measurement electronic device units 10 as the parent device sequentially generates the IDs upon power-on of the measurement electronic device system 4, and after assigning "1" as the own ID, assigns IDs "2", "3", and "4" to the series-connected measurement electronic device units 20 in the ascending order of the distance to the parent device.

Next, internal configurations of the measurement electronic device unit 10 as the parent device and the measurement electronic device unit 20 as the child device will be described in detail with reference to FIG. 3 and FIG. 4.

FIG. 3 is a block diagram showing the internal configuration of the measurement electronic device unit 10 as the parent device.

This measurement electronic device unit 10 is comprised of a main body 10A and a display unit 10B attachable/detachable to/from the main body 10A.

The main body 10A has, on its outer periphery, an external device interface 60, a downstream device interface 70, a detector interface 90, an external device interface 170, and a display unit interface 180, which correspond to the aforesaid female connector 6, female connector 7, and connectors 9, 17, and a later-described connector 18, respectively.

The external device interface 60 is connected to the external device 5 via the RS-232C interface cable. The downstream device interface 70 is connected to a later-described upstream device interface 80 of the measurement electronic device unit 20 as the child device that is first connected, and is connected to signal lines such as a trigger line 44, an RS485 line 45, a DL-OUT line, a reset line, and a sampling line, and also to a power line, though not shown.

The detector interface 90 is connected to the measurement detector 11. The external device interface 170 is capable of receiving input of a reset signal and a sampling signal from the external device 5 or other external devices. The display unit interface 180 is connected to a display unit interface 190 on the display unit 10B side.

This main body 10A has therein a CPU 31 controlling the entire measurement electronic device unit 10, a RAM 32 serving as a work memory and a data memory of the CPU 31, a RAM 33 recording data with large memory size, a ROM 34 storing operation programs and the like of the CPU 31, and a timer 35 for use in internal generation of a measured value save command, all of which are mutually connected via a CPU bus 43 to constitute a microcomputer.

Data on measured values temporarily saved in a later-described temporary storage memory 37 are transferred to the data recording RAM 33 by the CPU 31 and can be sequentially accumulated and stored in the data recording RAM 33.

All of the following parts are all connected to the CPU bus 43 to be controllable by the CUP 31: that is, a measurement control part 36 controlling a measurement operation by the detector 11; the temporary storage memory 37 temporarily storing (saving) the measured values; an RS-232C input/output control part 38 transmitting/receiving commands and measurement data to/from the external device 5; an RS 485 input/output control part 39 exchanging commands and measurement data with the child devices; a main input/output control part 40 performing operations such as connection and change of signal lines and also controlling transmission of the reset signal and the sampling signal; an input/output control part 42 controlling display and key input. The trigger line 44 is connected to the input/output control part 40 and the RS485 line 45 is connected to the input/output control part 39.

A power supply circuit 15 that is supplied with power from the external device through a later-described power connector to supply the power to each of the parts is also provided, but a power line thereof is not shown.

In the display unit 10B, a display 50 such as a liquid crystal display panel and four keys 51 to 54 are arranged on an upper face thereof, and the display unit interface 190 is disposed in a lower part thereof. In an interior thereof, a display control part 55, a key input control part 56, and an input/output control part 57 are provided. When this display unit 10B is attached to the main body 10A, the display unit interfaces 180 and 190 are connected in close contact as shown in the drawing.

Figure 4:
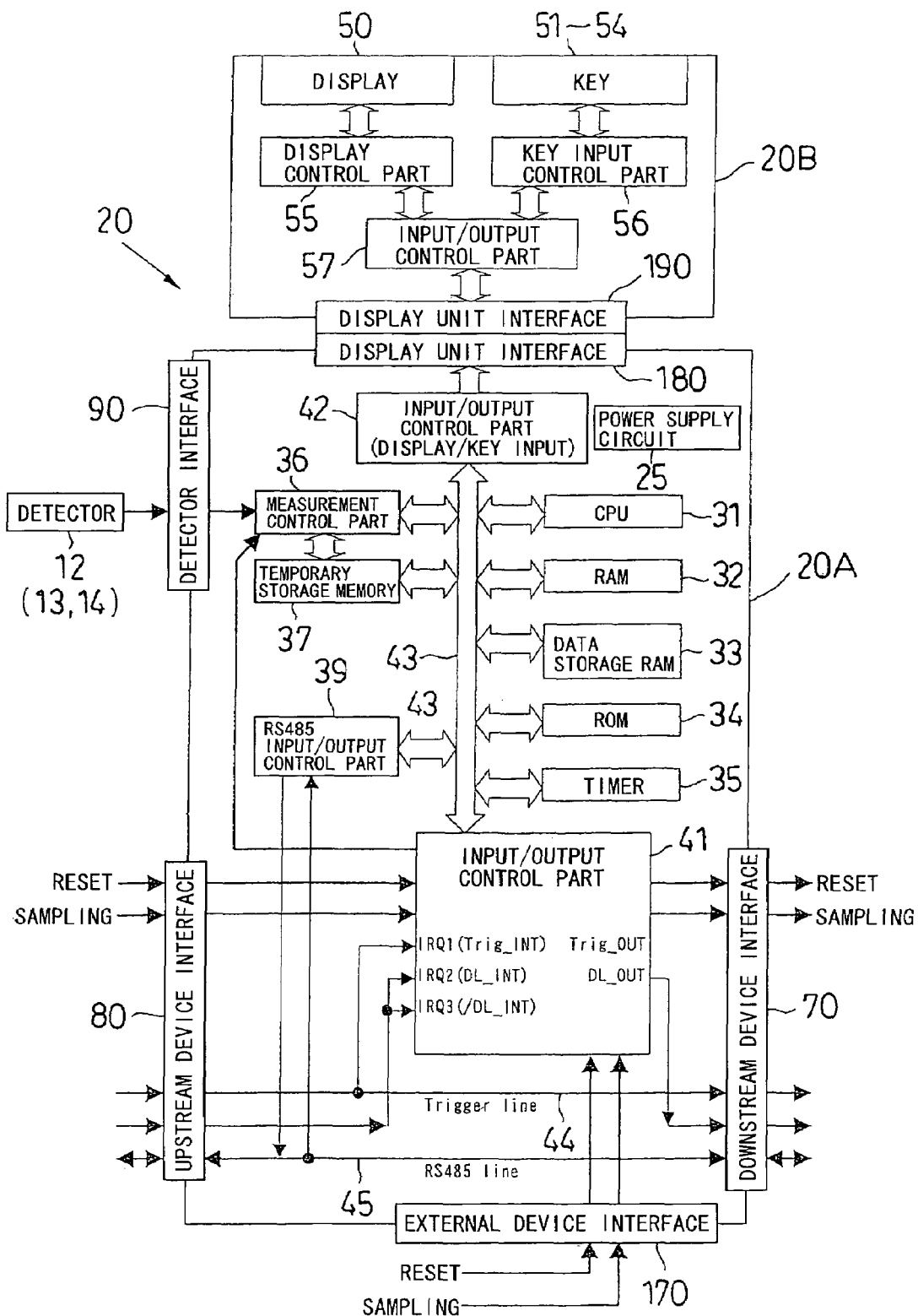
FIG. 4 is a block diagram showing an internal configuration of a measurement electronic device unit 20 as a child device in FIG. 2.

FIG. 4 is a block diagram showing the internal configuration of the measurement electronic device unit 20 as the child device. Since it also has substantially the same configuration as that of the measurement electronic device unit 10 as the parent device, the same reference codes are used to designate the same parts as those in FIG. 3, and description thereof will be omitted.

This measurement electronic device unit 20 is also constituted of a main body 20A and a display unit 20B attachable/detachable to/from the main body 20A. The configuration of the display unit 20B is completely the same as that of the display unit 10B of the measurement electronic device unit 10.

The main body 20A is different from the main body 10A of the measurement electronic device unit 10 in that the upstream device interface 80 corresponding to the male connector 8 shown in FIG. 2 is provided in place of the external device interface 60 for connection to the external device 5 and the RS-232C input/output control part 38 for communication with the external device is not provided. A trigger line 44 and an RS485 line 45 among various kinds of signal lines directly connect the upstream device interface 80 and the downstream device interface 70.

Here, when the parent device and the plural child devices are connected in series with the parent device being in the forefront, a parent device side is called an upstream side and the opposite side is called a downstream side.

An RS485 input/output control part 39 exchanges commands and measurement data with the parent device or the upstream child device and with the downstream child device.

An input/output control part 41 and a power supply circuit 25 are also slightly different from the input/output control part 40 and the power supply circuit 15 in the main body 10A of the parent device, and therefore, they are denoted by different reference codes. The power supply circuit 25 supplies each of the parts with voltage that is supplied from the power supply circuit 15 through power pins of the female connector 7 and the male connector 8 shown in FIG. 2.

These parts in the main bodies 10A, 20A execute later-described functions peculiar to this invention, i.e., simultaneous saving of measured values by the measurement electronic device units, change of measurement save commands, arithmetic processing on the saved measured values, simultaneous resetting for each group, and so on.

Next, a basic configuration of a connection state of the measurement electronic device units in the measurement electronic device system shown in FIG. 2 and functions thereof will be described with reference to FIG. 1.

FIG. 1 schematically shows the connection state in which the measurement electronic device unit 10 as the parent device shown in FIG. 3 and the three measurement electronic device units 20 as the child devices shown in FIG. 4 are connected in series by the connection of their female connectors (the downstream device interfaces 70) and male connectors 8 (upstream device interfaces 80) to constitute the measurement electronic device system 4.

In FIG. 1, 21 denotes a control part of the measurement electronic device unit 10 as the parent device and 22 denotes control parts of the measurement electronic device units 20 as the child devices, the control part being a generic name of all the circuits involved in control such as the CPU 31 and the input/output control part 40 or 41 in the main body 10A, 20A shown in FIG. 3 or FIG. 4. The display units 10B, 20B, the interfaces, the detectors 11 to 14, and so on which are shown in FIG. 3 and FIG. 4 are omitted in this drawing.

In the following description, the measurement electronic device unit 10 is simply referred to as "a parent device", and the three measurement electronic device units 20 are referred to as "a child device 1", "a child device 2", and "a child device 3" in the order from the parent device side.

As shown in FIG. 1, the measurement electronic device units, i.e., the parent device and the three child devices 1 to 3 are skewed by their signal lines, namely, the trigger lines 44 and the RS485 lines 45, which are mutually coupled to form a common trigger line and a common command line. Also connected are the DL-OUT lines that transmit a signal from the control part 21 of the parent device to the control part 22 of the child device 1 and from the control parts 22 of the child devices to the control parts 22 of the downstream child devices based on judgment of the CPU 31 of the control part 21 or the CPUs 31 of the control parts 22. Besides, the sampling lines transmitting a later-described sampling signal, the reset lines transmitting a reset signal, the power lines supplying power, and so on are mutually connected, but they are not shown in the drawing here.

The trigger lines 44 are signal lines that are used for the parent device to simultaneously transmit a command of its control part 21 to the control parts 22 of the child devices 1 to 3 and also to the own control part 21. The RS485 lines 55 are signal lines that are used for mutual exchange of commands and data among the control part 21 of the parent device and the control parts 22 of the child devices.

Each of M0 to M3 shown under the parent device and the child devices 1 to 3 in FIG. 1 includes an identification code (ID) set and stored in the memory of the measurement electronic device unit and parameters for an arithmetic operation on its measured value.

Each of the parent device and the child devices 1 to 3 stores in the memory (RAM 32 etc.) in the control part 21 or 22 thereof the set ID, direction (±) of the detector in terms of the contact direction with a measured object, and operation parameters for a multiplication value and a division value. The parent device further stores in the same memory the number of the units as operation targets (the number of operations) and the IDs of the units as the operation targets (operation IDs). These parameters are set using the keys 51 to 54 of the display unit 10B, 20B shown in FIG. 3 and FIG. 4 respectively, and an operation method thereof will be described later.

Here, an example of an arithmetic/measurement operation by this measurement electronic device system 4 will be described with reference to the flowchart in FIG. 5.

Figure 5:
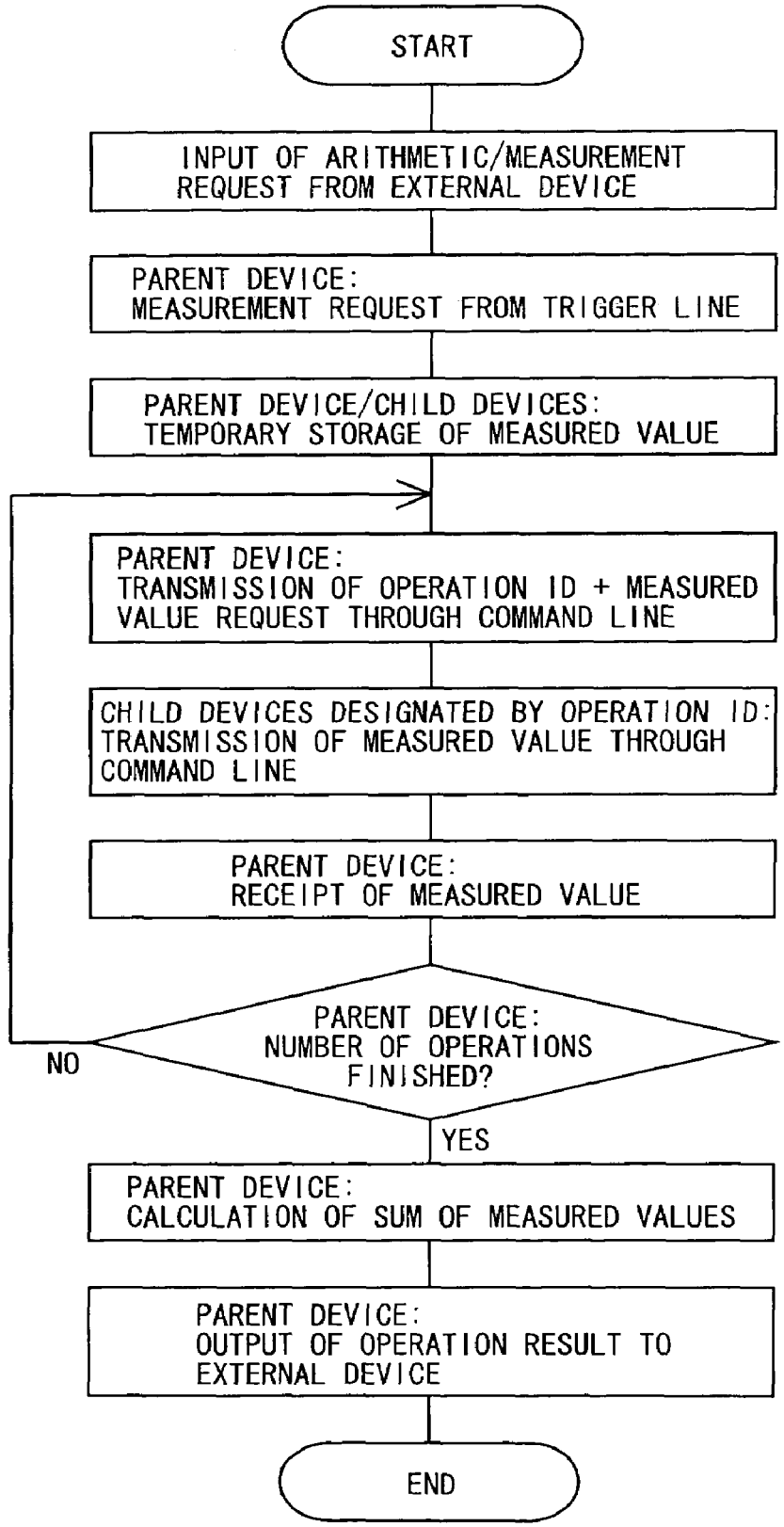
FIG. 5 is a flowchart showing an example of an arithmetic/measurement operation by the measurement electronic device system shown in FIG. 4.

When the measurement electronic device system 4 shown in FIG. 1 starts the processing shown in FIG. 5 and an arithmetic/measurement request is inputted to the parent device from the external device 5, the parent device sends the measurement request (measured value save command) from the trigger line 44 to the control parts 22 of the child devices 1 to 3 and at the same time, returns and inputs the request also to its own control part 21. Consequently, the parent device and the child devices 1 to 3 simultaneously operate to temporarily store and save the measured values by the detectors 11 to 14 shown in FIG. 2 from the measurement control parts 36 to the temporary storage memories 37 which are shown in FIG. 3 and FIG. 4.

The parent device thereafter transmits the operation ID + measured value request through the command line (RS485 line) 45 in sequence according to the number of the operations and the operation IDs in the operation parameters stored in the memory. Then, each of the child devices designated by the operation IDs (the child devices whose IDs match the operation IDs) individually performs an arithmetic operation on the measured value which was temporarily stored in response to the measurement request, using the operation parameters (± direction, the multiplication value, and the division value) stored in the memory and transmits the resultant measured value to the parent device through the command line (RS485 line) 45.

Upon receiving the measured values, the parent device judges whether or not the same number of the arithmetic operations as the number of operations have been finished, and if not, returning to the process of transmitting the operation ID + measured value request, the parent device transmits the next operation ID + measured value request through the command line 45, and the aforesaid processes are repeated.

When the number of the received measured values reaches the number of operations stored in the parent device, the parent device judges that the arithmetic operations corresponding to the stored number of the operations have been finished to calculate the sum of the received measured values (including the measured value of the parent device if the parent device is also an operation target since the parent device also individually performs arithmetic operation on its measured value in this case). Then, it outputs the operation result from the RS-232C input/output control part 38 shown in FIG. 3 to the external device 5 through the external device interface 60, to finish the processing.

Incidentally, the communication between the parent device and the external device 5 is not limited to the communication through the RS-232C but may be serial communication through an RS-422, an RS485, a USB, or the like, or may be parallel communication.

Further, as the external device interface 60 of the parent device shown in FIG. 3 and as the upstream device interface 80 of the child device shown in FIG. 4, interfaces compatible to the both units (with the same structure) may be used.

As described above, according to this measurement electronic device system 4, one-time measurement request (measured value save command) from the parent device causes the parent device and all the child devices coupled thereto to simultaneously store and save the measured values by the respective detectors in the temporary storage memories 37, which results in high simultaneity of the measurement (a measurement timing error is 100 μsec or smaller). Moreover, the arithmetic operation on the measured values can be performed simply and quickly since each of the units separately performs necessary arithmetic operation on the measured value thereof and the parent device only calculates the sum of the resultant measured values of the respective arithmetic operations.

It is also possible for the individual measurement electronic device units 10, 20 to interrupt other processing to process the measurement request (measured value save command) from the trigger line 44, and in that case, simultaneity of the measurement is further enhanced.

Simultaneity of the measurement is especially important in, for example, the aforesaid case where the thickness of a rolled iron plate is measured by two facing detectors sandwiching the iron plate and the sum of the measured values by the respective detectors is calculated, since the measured values constantly vary.

If the measurement electronic device system of this invention is used, with the structure consisting of the parent device and one child device and with the operation parameters being set as shown in Table 1, it is possible to obtain, as the operation result by the parent device, the thickness by calculating the sum of the measured values by the parent device and the child device 1 to which a pair of facing detectors sandwiching the iron plate are connected.

TABLE 1

|  | parent device | child device |
|---|---|---|
| ID | 1 | 2 |
| direction (±) | + | + |
| multiplication | 1 | 1 |
| division | 1 | 1 |
| number of operations | 2 | |
| operation ID | 1 | |
| operation ID | 2 | |
| operation ID | . | |
| | . | |
| | . | |
| | . | |
| measured value | 12.8 | 13.2 |
| individual operation | 12.8 | 13.2 |
| operation result | 26.0 | |

In the example shown in Table 1, the measured value by the parent device is 12.8, the measured value by the child device 1 is 13.2, and the multiplication value and the division value are both "1", which means that the measured values by the individual operations are the measured values multiplied by 1 and divided by 1, resulting in the same values as the measured values. The operation result by the parent device is the sum of the measured values, i.e., 12.8+13.2=26.0.

In another example where measured values of a height position of a measured object by three detectors are averaged to find its height, the height can be measured in such a manner that the detectors connected to the parent device and the child devices 1 and 2 of the measurement electronic device system 4 according to this invention measure the height position, and operation parameters as shown in Table 2 are set and stored in the memories of the respective control parts.

TABLE 2

|  | parent device | child device 1 | child device 2 |
|---|---|---|---|
| ID | 1 | 2 | 3 |
| direction (±) | + | + | + |
| multiplication | 1 | 1 | 1 |
| division | 3 | 3 | 3 |
| number of operations | 3 | | |
| operation ID | 1 | | |
| operation ID | 2 | | |
| operation ID | 3 | | |
| . | | | |
| . | | | |
| . | | | |
| measured value | 12.8 | 13.2 | 13.3 |
| individual operation | 4.27 | 4.40 | 4.43 |
| operation result | 13.1 | | |

In the example shown in Table 2, the measured value by the parent device is 12.8, the measured value by the child device 1 is 13.2, the measured value by the child device 2 is 13.3, the multiplication values are all "1", and the division values are all "3", which means that the measured value by each individual operation is the measured value multiplied by 1 and divided by 3. Therefore, the individual operation value of the parent device is 12.8×⅓=4.27, the individual operation value of the child device 1 is 13.2×⅓=4.40, and the individual operation value of the child device 2 is 13.3×⅓=4.43. The operation result of the parent device is the sum of the respective individual operation values, i.e., 4.27+4.40+4.43=13.1.

In this manner, four operations of various kinds on the plural measured values can be simply performed.

Next, another example of measurement processing by the measurement electronic device system of the invention will be described with reference to FIG. 6 to FIG. 8.

Figure 6:
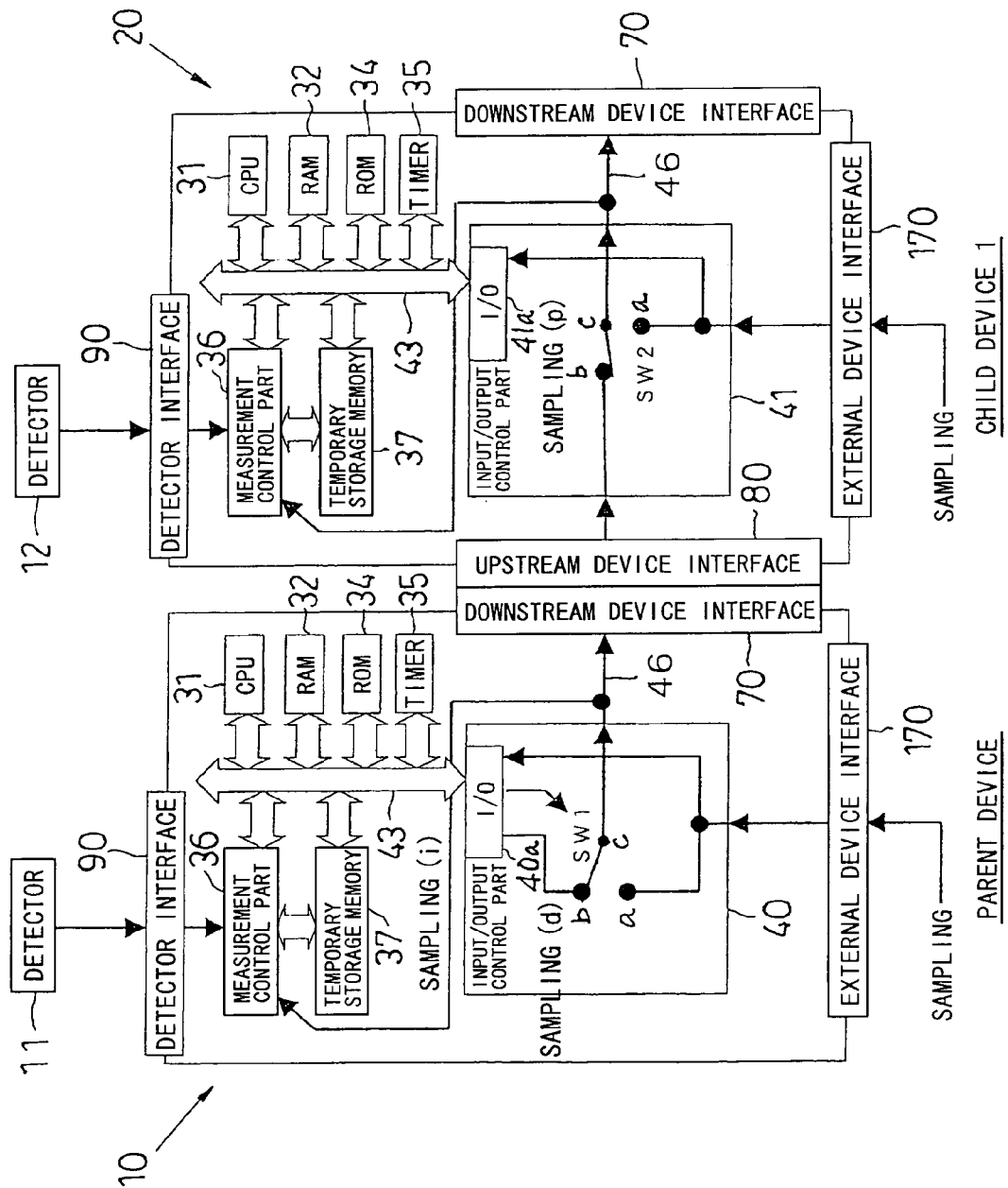
FIG. 6 is a block diagram showing internal configurations of the parent device and a child device 1 of the measurement electronic device system according to the invention, in which parts involved in sampling are mainly shown.

FIG. 6 is a block diagram showing internal configurations of the parent device and the child device 1, in which parts involved in sampling are mainly shown and display units and so on are omitted. In FIG. 6, the same reference codes are used to designate the same parts as those in FIG. 3 and FIG. 4, and description thereof will be omitted.

In this example, the sampling lines 46 in the parent device and the child device 1 are coupled to each other by the connection of the downstream device interface 70 of the parent device and the upstream device interface 80 of the child device 1, to be connected to the downstream device interface 70 via the input/output control part 41 in the child device 1, and if not-shown child devices are series connected to the child device 1, the sampling lines in these child devices are also sequentially connected in series via the input/output control parts 41 in the respective child devices.

The sampling line 46 on an output side of the input/output control part 40 of the parent device is connected to the measurement control part 36 controlling the temporary storage and so on of the measured value by the detector 11, and the sampling line 46 on an output side of the input/output control part 41 of the child device 1 is also connected to the measurement control part 36 controlling the temporary storage and so on of the measured value by the detector 12. The sampling lines 46 in the not-shown other child devices on output sides of the input/output control parts 41 are also connected to the measurement control parts 36.

Further, an electronic changeover switch SW1 is provided in the input/output control part 40 of the parent device, the changeover switch SW1, with a movable contact "c" thereof being connected to the sampling line 46 and with one fixed contact "a" thereof being connected, together with an input line of a sampling signal inputted from the external device interface 170, to an external sampling signal input port of an I/O 40a that is an input/output port of the input/output control part 40 for the CPU bus 43. The other fixed contact "b" is connected to an internal sampling signal output port of the I/O 40a.

The switching of the changeover switch SW1 is controlled by the CPU 31 that sends a command signal through the I/O 40a upon detection of a key operation on the not-shown display unit or an operation of a not-shown DIP switch. Incidentally, the switching operation may be directly performed by the DIP switch. In this case, this changeover switch SW1 may be provided outside the input/output control part 40.

The child device 1 also has a changeover switch SW2 provided in the input/output control part 41. Its movable contact "c" is also connected to the sampling line 46, and a fixed contact "a" together with an input line of a sampling signal inputted from the external device interface 170 is connected to an external sampling signal input port of an I/O 40a that is an input/output port of the input/output control part 41 for a CPU bus 43. The other fixed contact "b" is connected to the sampling line 46 on the-upstream device interface 80 side.

This changeover switch SW2 may be a manually changeable DIP switch, but may also be an electronic changeover switch changeable by a signal from the CPU 31.

The changeover switch SW1 of the parent device shown in FIG. 6 is a means for selectively changing connection of a signal line connected to the child devices being the other measurement electronic device units to one of a signal line from an external device and a signal line of an internal output.

The changeover switch. SW2 of the child device is a means for disconnecting mutually coupled signal lines of the measurement electronic device units except the parent unit to change connection to a signal line from an external part.

Here, various measured value storage modes in a measurement electronic device system will be described with reference to FIG. 7 and FIG. 8, the measurement electronic device system being configured such that three child devices (a child device 1, a child device 2, and a child device 3) with the same configuration as that of the measurement electronic device unit 20 as the child device 1 shown in FIG. 6 are coupled in series to the measurement electronic device unit 10 as the parent device shown in FIG. 6. A sampling command and a sampling signal in the following description correspond to the measured value save command in the example previously described. "Measured value storage" means that the measurement control parts 36 causes the measured values by the detectors in the parent device and the child devices to be temporarily stored and saved in the temporary storage memory 37.

First, FIG. 7 will be referred to for describing a sampling operation executed in response to a command from the external device 5 that is inputted to the RS-232C input/output control part 38 through the external device interface 60 of the parent device shown in FIG. 3.

The changeover switch SW1 in the parent device shown in FIG. 6 is switched to the fixed contact "b" side (a CPU side in FIG. 7) as shown in the drawing, and the changeover switches SW2 in the child devices 1 to 3 are all switched to the fixed contact "b" side as shown in FIG. 6, so that the sampling lines 46 in the child devices 1 to 3 are all directly connected to one another to be connected to the internal sampling signal output port of the I/O 40a in the input/output control part 40 through the sampling line 46 in the parent device.

Here, when a storage request command is inputted from the external device 5 to the RS-232C input/output control part 38 through the external device interface 60 of the parent device, the CPU 31 recognizes this to generate a sampling command with a fixed pulse width measured by the timer 35 and outputs it to the sampling line 46 via the I/O 40a and the changeover switch SW1. Consequently, the sampling command is inputted simultaneously to the measurement control part 36 of the parent device and all the measurement control parts 36 of the child devices 1 to 3 whose sampling lines 46 are directly connected. This causes the parent device and the child devices 1 to 3 to start processing for measured value storage simultaneously at each rising instant of the sampling command.

Every time the storage request command is inputted to the RS-232C input/output control part 38, the above-described operation is repeated and the measured value storage is executed in the parent device and the child devices 1 to 3.

The right half of FIG. 7 shows a case of another measured value storage mode, and when a measurement start command is inputted from the external device 5 to the RS-232C input/output control part 38, the CPU 31 recognizes this to generate a sampling command with a fixed pulse width measured by the timer 35, at a predetermined cycle to output it to the sampling line 46 via the I/O 40a and the changeover switch SW1. Consequently, as in the above-described case, processing for measured value storage is executed in the parent device and all the child devices 1 to 3 at each rising instant of the sampling command.

Thereafter, when a measurement end command is inputted from the external device 5 to the RS-232C input/output control part 38, the CPU 31 recognizes this to stop generating the sampling command. Therefore, none of the parent device and the child devices 1 to 3 executes the processing for measured value storage thereafter.

Figure 8:
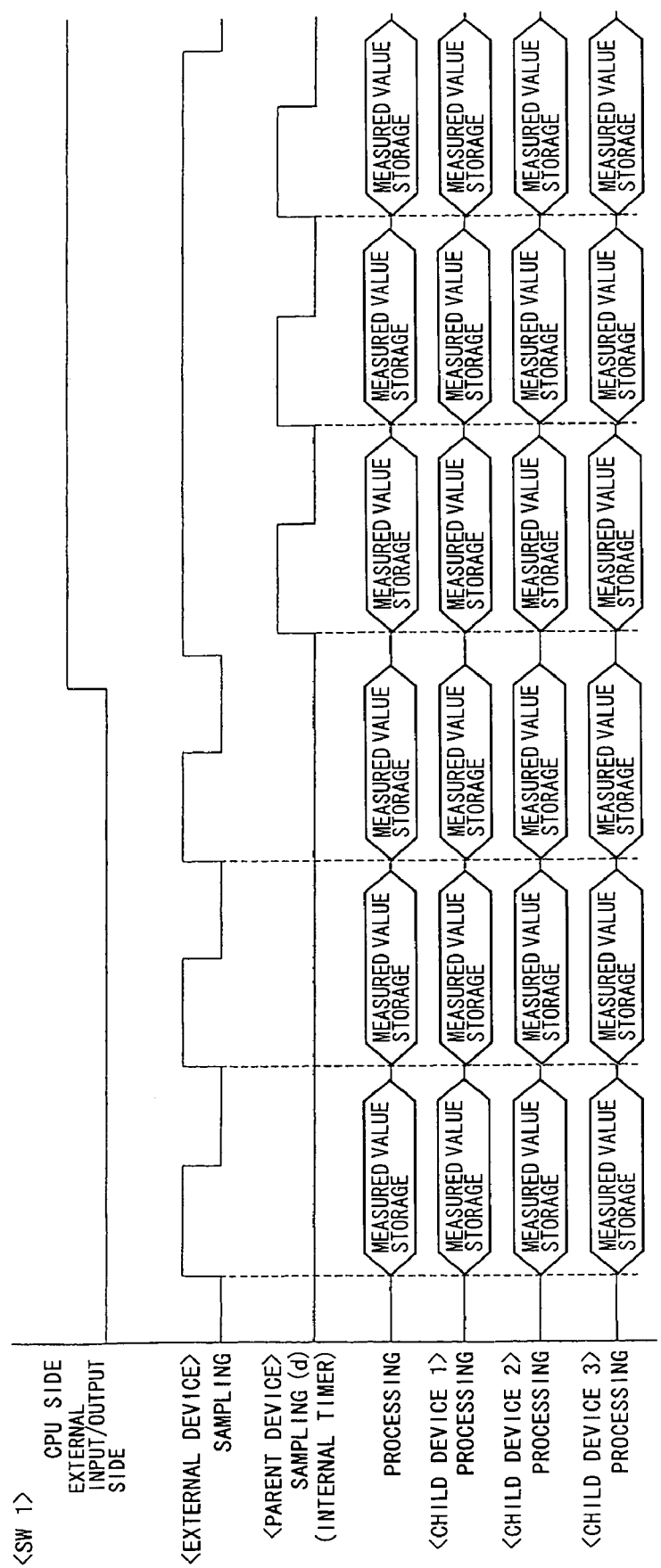
FIG. 8 is a timing chart similarly showing a sampling operation when it is performed in response to a command from an external device interface 170 of the same.

Next, FIG. 8 will be referred to for describing a sampling operation mode in response to a sampling signal from an external device that is inputted to the input/output control part 40 through the external device interface 170 of the parent device shown in FIG. 6.

In this case, it is also assumed that the changeover switches SW2 of the child devices 1 are switched to the fixed contact "b" side as shown in FIG. 6 so that all the sampling lines 46 are directly coupled.

When the changeover switch SW1 of the parent device is in a state of being switched to the fixed contact "b" side (external input/output side in FIG. 8), every time the sampling signal from the external device is inputted to the input/output control part 40 through the external device interface 170 of the parent device, the sampling signal is inputted to the measurement control parts 36 of the parent device and the child devices 1 to 3 through the sampling lines 46 and they simultaneously start processing for measured value storage at each rising instant of the sampling signal, as shown in the left half of FIG. 8.

As shown in the right half of FIG. 8, when the changeover switch SW1 of the parent device is in a state of being switched to the fixed contact "a" side (CPU side in FIG. 8), only while the sampling signal from the external device is continuously inputted to the input/output control part 40 through the external device interface 170 of the parent device, the CPU 31 recognizes this from I/O 40a to output a sampling command with a fixed pulse width to the I/O of the input/output control part 40 at a predetermined cycle using the timer 35, as in the case described with FIG. 7 when the measurement start command is received, and the sampling command is inputted to the measurement control parts 36 of the parent device and the child devices 1 to 3 from the sampling signal output port of the input/output control part 40 through the changeover switch SW1 and the sampling lines 46. Therefore, the parent device and the child devices 1 to 3 simultaneously start executing the processing for the measured value storage at each rising instant of the sampling command.

When the changeover switch SW2 of any one of the child devices is switched to the fixed contact "a" side (external input/output side), the sampling lines 46 are disconnected at this point, so that the sampling lines 46 after this point are connected to a signal line to which a sampling signal of an external device is inputted from the external interface 170.

Consequently, the parent device and the child devices on the upstream side of the child device whose changeover switch SW2 is switched to the fixed contact "a" side execute the processing for the measured value storage in synchronization with the sampling signal from the external device inputted to the parent device or the sampling command internally generated in the parent device, and the child device whose changeover switch SW2 is switched to the fixed contact "a" side and its downstream side child devices execute the processing for the measured value storage in synchronization with the sampling signal from the external device that is inputted to the child device whose changeover switch SW2 is switched to the fixed contact "a" side.

The parent device and the plural child devices coupled thereto are thus grouped, which enables the execution of processing for the measured value storage by using the parent device and only part of the child devices, or enables different groups to execute the processing for the measured value storage at different timings.

The measurement electronic device system according to the invention has high versatility since it is capable of executing the processing for the measured value storage in various modes and these modes can be selectively used according to an intended purpose.

Figure 19:
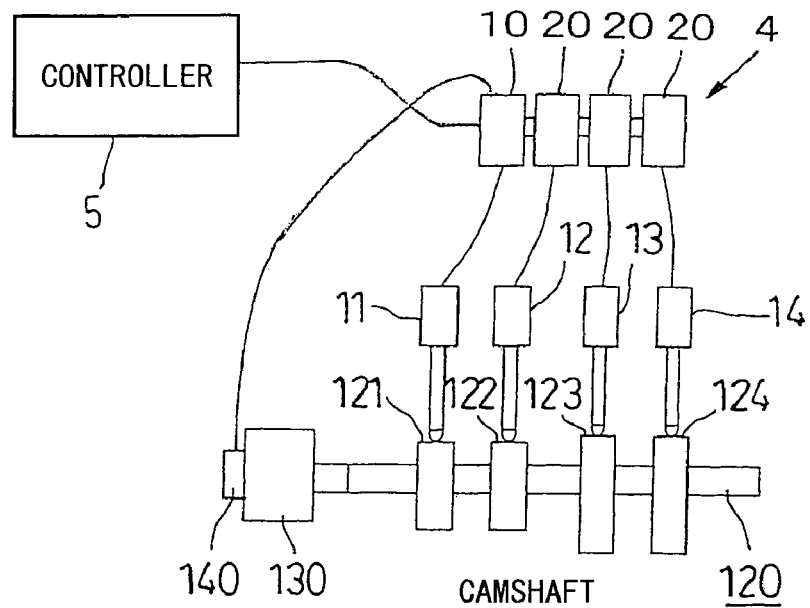
FIG. 19 is a block diagram showing an example where the electronic device system according to the invention is used to measure the shapes of respective cams of a camshaft.
Figure 20:
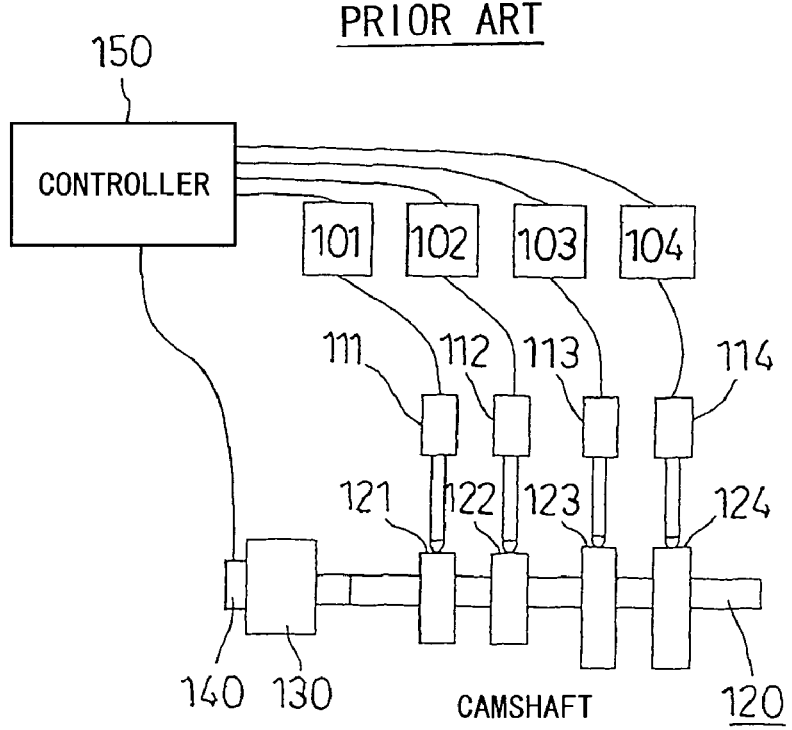
FIG. 20 is a block diagram showing an example of a conventional measurement electronic device system for measuring the shapes of respective cams of a camshaft.

Here, FIG. 19 shows a configuration example when the measurement electronic device system according to this invention is used to measure the shapes of cams of a camshaft as in the conventional example shown in FIG. 20. In this case, the measurement electronic device system 4 in which the measurement electronic device unit 10 as the parent device and the three measurement electronic device units 20 as the child devices are connected in series is used, the changeover switch SW1 shown in FIG. 6 in the measurement electronic device unit 10 as the parent device is switched to the fixed contact "a" side (external input/output side), and the changeover switches SW2 in all the measurement electronic device units 20 as the child devices are switched to the fixed contact "b" side (a side for direct connection of the sampling line 46).

A pulse signal that is generated from an encoder 140 every time a motor 130 rotates a camshaft 120 by a predetermined angle is inputted as a sampling signal to the external device interface 170 of the parent device. Consequently, every time the pulse signal is inputted from the encoder 140, it is inputted to all the control parts of the parent device and the three child devices through the sampling lines 46, and measured values of positions corresponding to the shapes of the cams measured by the detectors 11 to 14 are temporarily stored and saved in the temporary storage memories 37 simultaneously at each rising instant of the pulse signal. The measured values are sequentially transferred to the RAMs 32 in FIG. 6 or the data storage RAMs 33 shown in FIG. 3 and FIG. 4 so that they can be accumulated and stored therein.

After the camshaft 120 is caused to make one rotation or more in this manner, the measurement electronic device unit 10 as the parent device instructs the measurement electronic device units 20 as the child devices to transfer the measured values stored therein through the RS485 line shown in FIG. 1, and transmits the transferred measured values to the external device (a controller in this case) 5 connected to the external device interface 60. The controller 5 can obtain data on the measured values with high simultaneity which are individually measured by the parent device and the child devices every time the camshaft is rotated by the predetermined angle, so that accurate data on the shapes of the cams and on the relative relation among the cams can be obtained.

Next, referring to FIG. 9 and FIG. 10, grouping in zero resetting by the measurement electronic device system according to this invention will be described.

Figure 9:
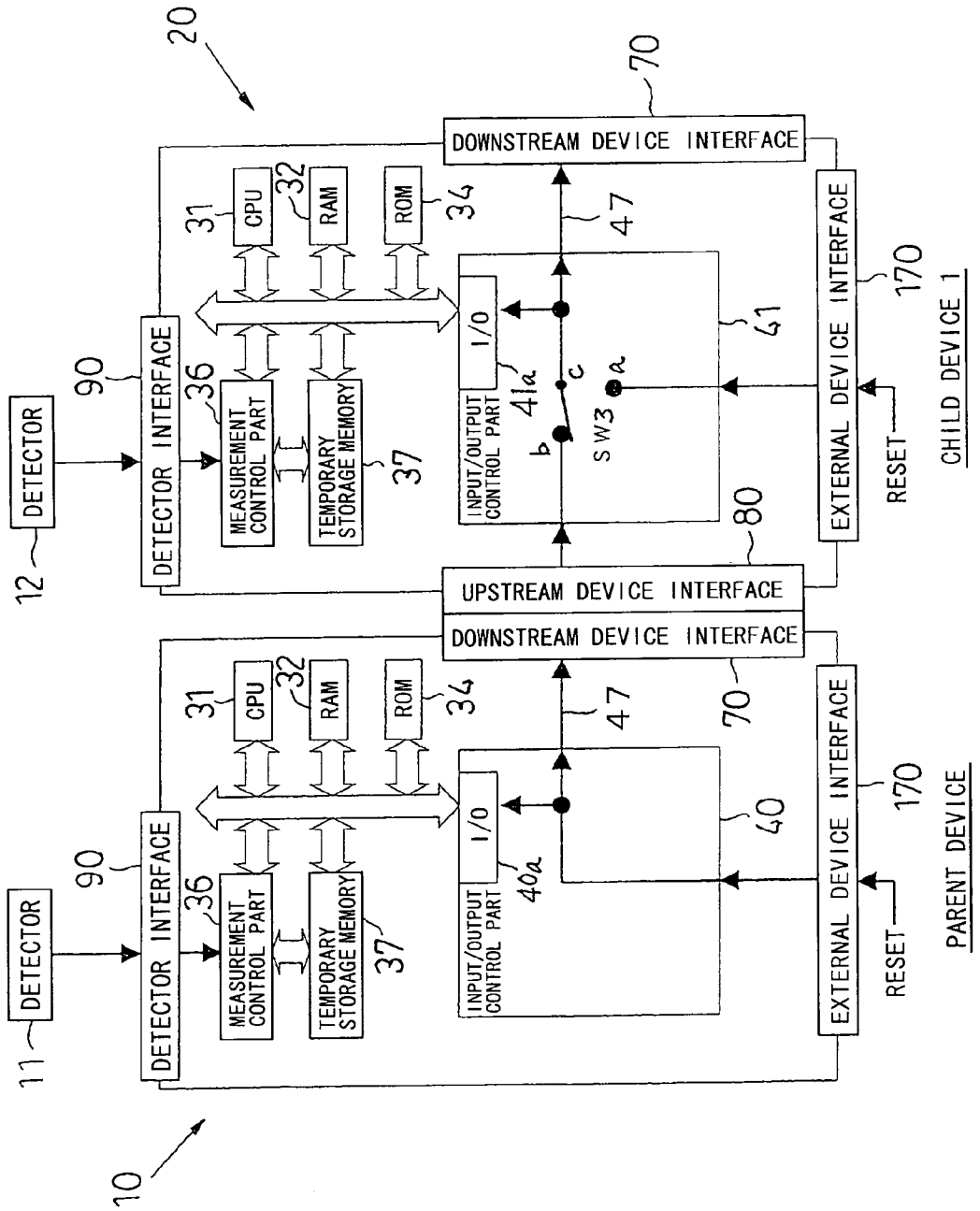
FIG. 9 is a block diagram showing internal configurations of the parent device and the child device 1 of the measurement electronic device system according to the invention, in which parts involved in resetting of stored measured values are mainly shown.

FIG. 9 is a block diagram showing internal configurations of the parent device and the child device 1 of the measurement electronic device system according to the invention, in which parts involved in resetting of stored measured values are mainly shown and the display units and so on are omitted. In FIG. 9, the same reference codes are used to designate the same parts as those in FIG. 3, FIG. 4, and FIG. 6, and description thereof will be omitted.

In this example, the reset lines 47 in the parent device and the child device 1 are coupled to each other by the connection of the downstream device interface 70 of the parent device and the upstream device interface 80 of the child device 1, to be connected to the downstream device interface 70 via the input/output control part 41 in the child device 1, and if not-shown child devices are series connected to the child device 1, all the reset lines in these child devices are also sequentially connected in series via the input/output control parts 41 in the respective child devices.

A changeover switch SW3 is provided in the input/output control part 41 in each of the child devices, and if a movable contact "c" thereof is switched to a fixed contact "b" side, the reset line 47 on the upstream device interface 80 side and the reset line 47 on the downstream device interface 70 side are connected. When the movable contact "c" of this changeover switch SW3 is switched to a fixed contact "a" side, the reset lines are disconnected at this point, so that the reset line 47 on the downstream device interface 70 side is connected to a signal line to which a reset signal of the external device is inputted from the external device interface 170.

Therefore, this changeover switch SW3 in the child device is also a means for disconnecting mutually coupled signal lines (the reset lines in this case) of the measurement electronic device units 20 except the parent unit to change connection to a signal line from an external part. This changeover switch SW3 may be a DIP switch that is manually operated for changeover, or may be an electronic switch that is changeable by a signal from the CPU 31.

The signal line to which the reset signal of the external device is inputted from the external device interface 170 of the parent device is connected to a reset signal input port of the I/O 40a of the input/output control part 40 and is also connected to the reset line 47. Further, the reset line 47 on the downstream device interface 70 side of the child device is also connected to the reset signal input port of the I/O 40a of the input/output control part 41.

When the changeover switch SW3 in the child device 1 is in the switching state shown in FIG. 9, upon input of the reset signal to the external device interface 170 of the parent device, the reset signal is inputted simultaneously to the I/O 40a of the parent device and the I/Os 40a of the child devices through the reset lines 47. The CPUs 31 of the respective units recognize this to reset (clear) the storage of the measured values stored in the temporary storage memories 37 and the RAMs 32 or the data storage RAMs 33 of the respective units.

When the changeover switch SW3 of any one of the child devices is switched to the fixed contact "a" side, the reset lines 47 are disconnected to be grouped into the reset lines on the upstream side of this unit and the reset lines of this child device and its downstream side child devices, so that different groups perform reset processing of the stored measured values in response to different reset signals from an external device.

Figure 10:
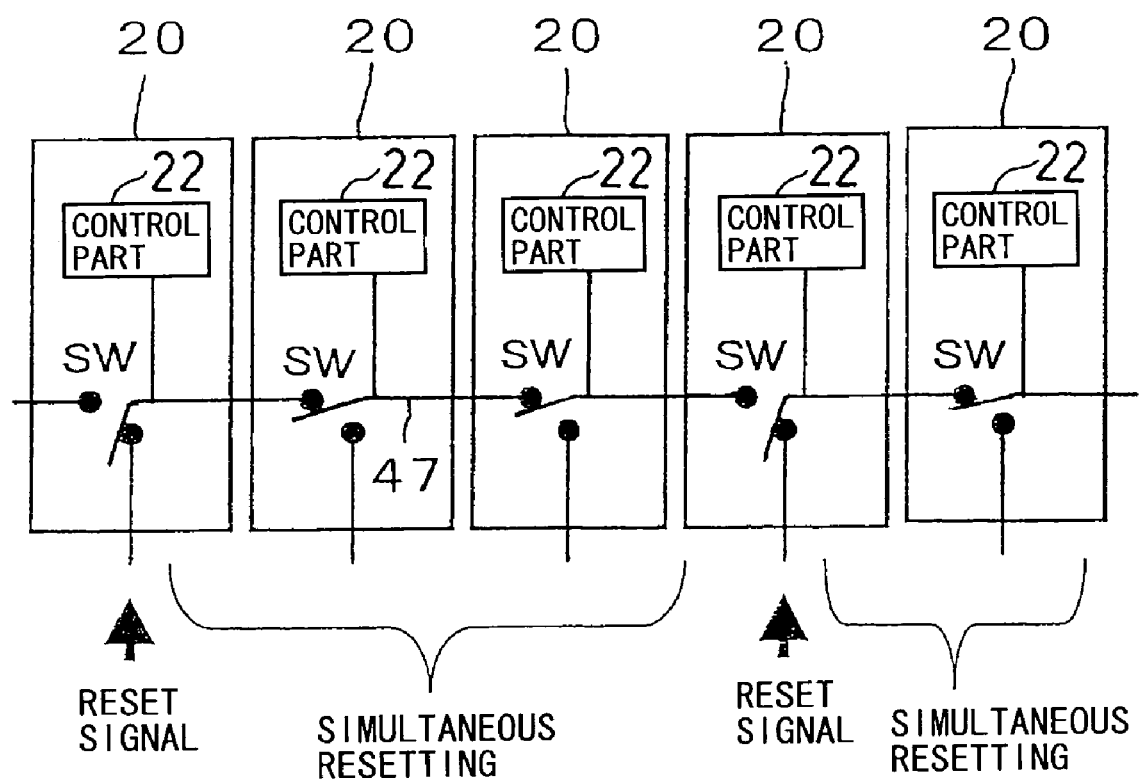
FIG. 10 is an explanatory diagram similarly showing an example of resetting in which the plural child devices are grouped.

An example of such grouping will be shown in FIG. 10. In this example, each of the five measurement electronic device units 20 as the child devices has a changeover switch SW for disconnecting mutually connected internal signal lines (the reset lines 47 in this case) to change the connection to a signal line from an external part, and the changeover switch SW of the left-end child device and the changeover switch of the second child device from the right are switched to a signal line from an external part.

Therefore, the measurement electronic device units 20 are grouped into the three units on the left side and the two units on the right side, and the storage of the measured values in the respective groups are reset (cleared) by different external reset signals.

With this structure, if simultaneous zero resetting is desired for two measuring instruments for one pin and separate zero resetting is desired for two sets of the measuring instruments as in the aforesaid case of measuring the inclinations of two pins, this can be easily realized in such a manner that the measurement electronic device units are grouped by each set of the detectors and different groups execute zero resetting by different reset signals respectively.

When, instead of the reset lines, signal lines for peak clear and peak hold are mutually connected, these signal lines can be grouped by providing changeover switches SW in these signal lines in the respective measurement electronic device units 20.

Further, if the trigger lines 44 shown in FIG. 1 are provided with changeover switches SW in the respective child devices, processing such as sampling, resetting, peak hold, and peak clear can be executed in a grouped manner.

The control parts 21, 22 in the measurement electronic device units 10, 20 constituting the measurement electronic device system of this embodiment also have a peak hold function of holding a peak value of the measured values sequentially measured and a peak clear function of clearing the held peak value.

Next, examples of outer appearances of the measurement electronic device units as the parent device and the child device constituting the measurement electronic device system according to the invention will be shown in FIG. 11 to FIG. 14.

Figure 11:
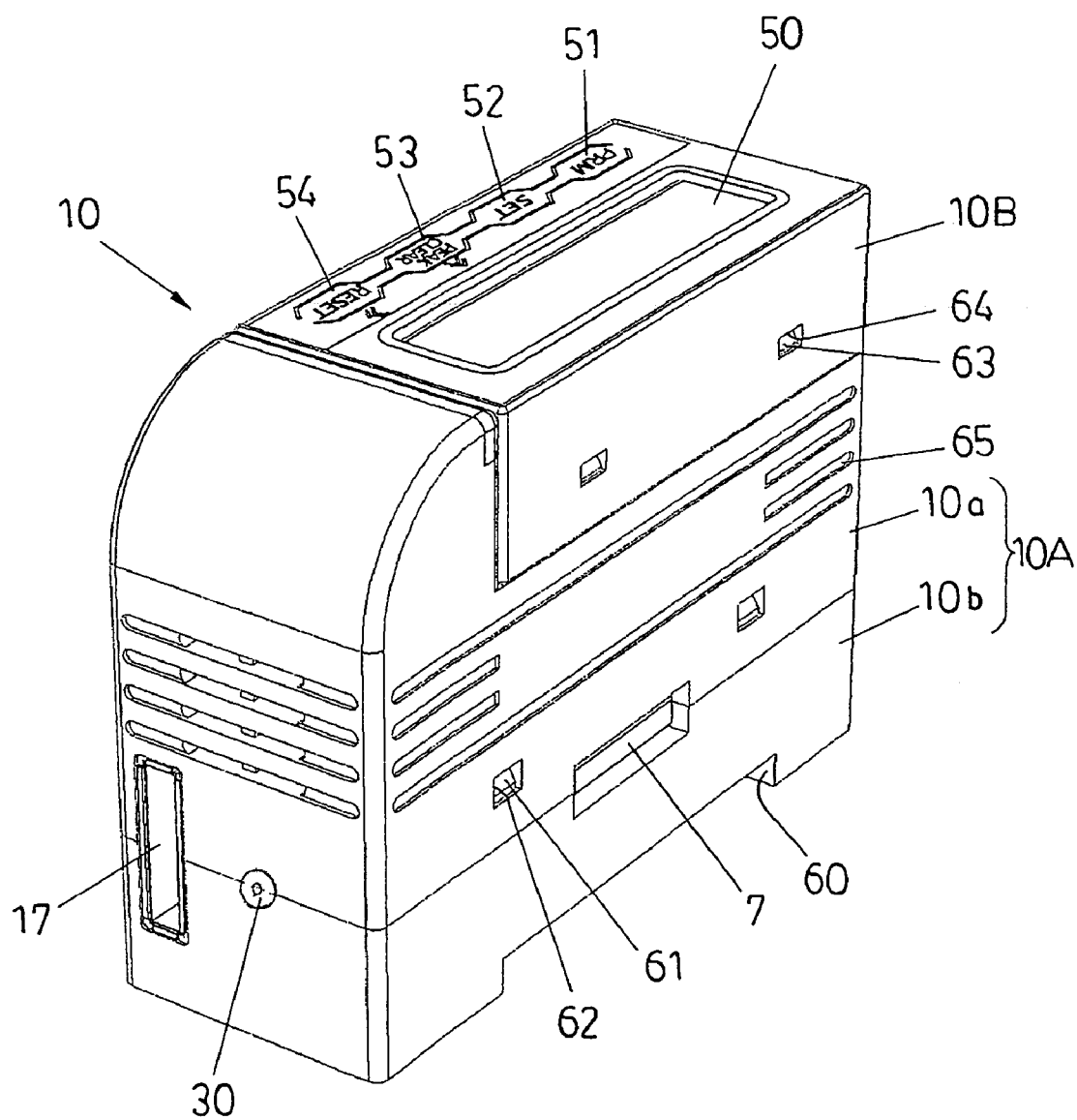
FIG. 11 is a perspective view showing an example of an outer appearance of the parent device of the measurement electronic device system according to the invention.
Figure 12:
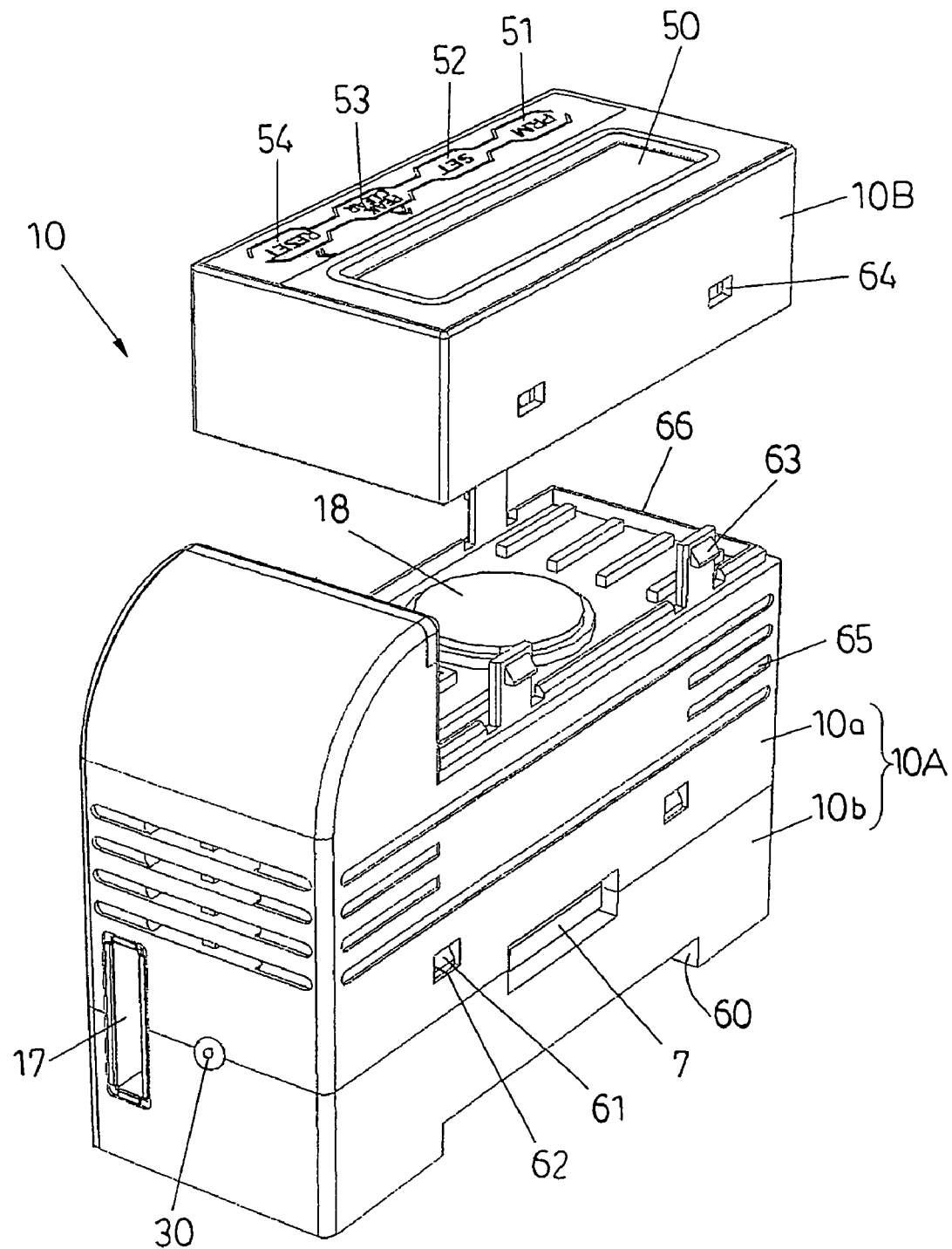
FIG. 12 is similarly a perspective view showing a state where a display unit of the same is detached from a main body.
Figure 13:
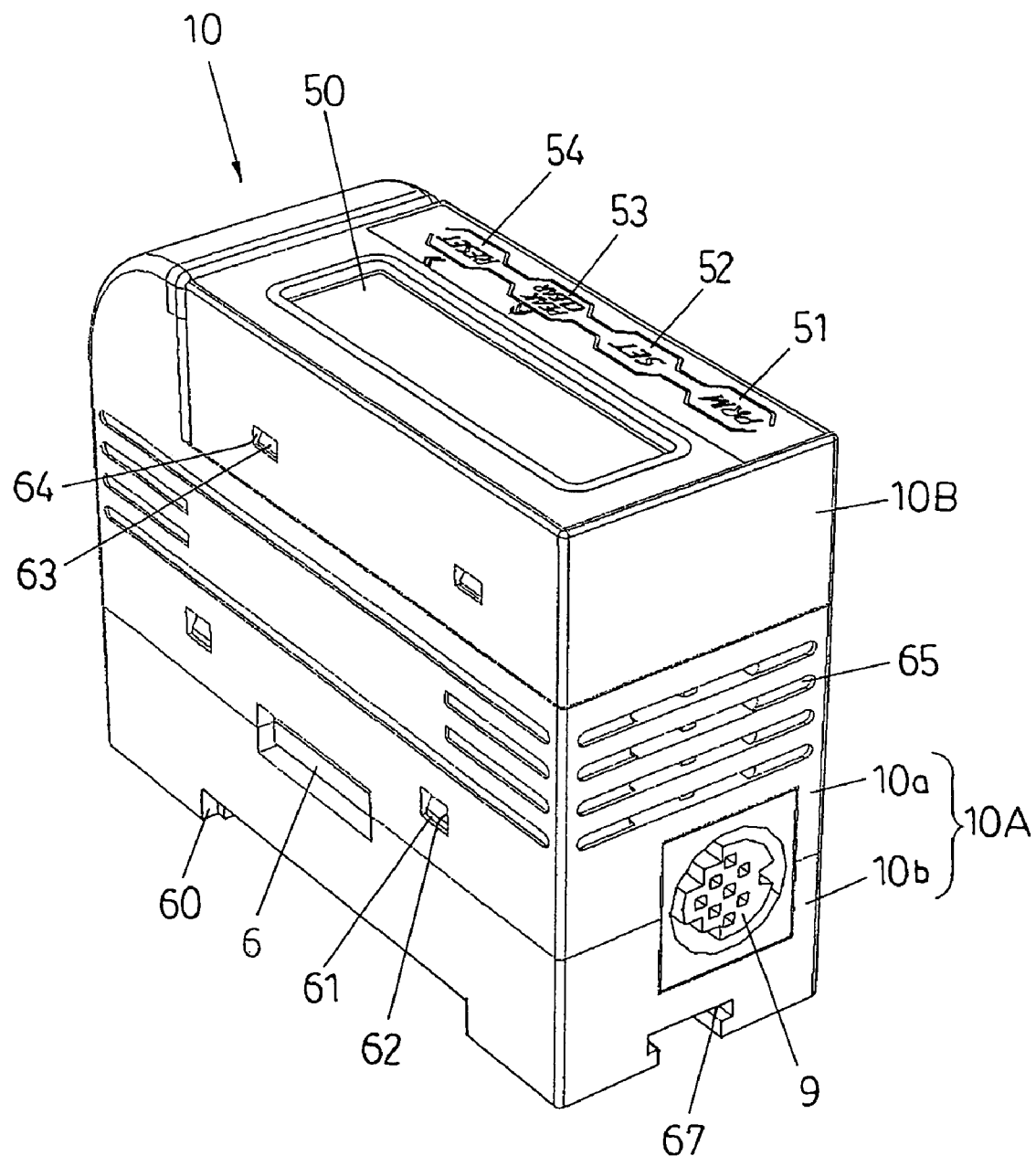
FIG. 13 is a perspective view of the parent device shown in FIG. 11 when it is seen from an opposite side in a longitudinal direction.
Figure 14:
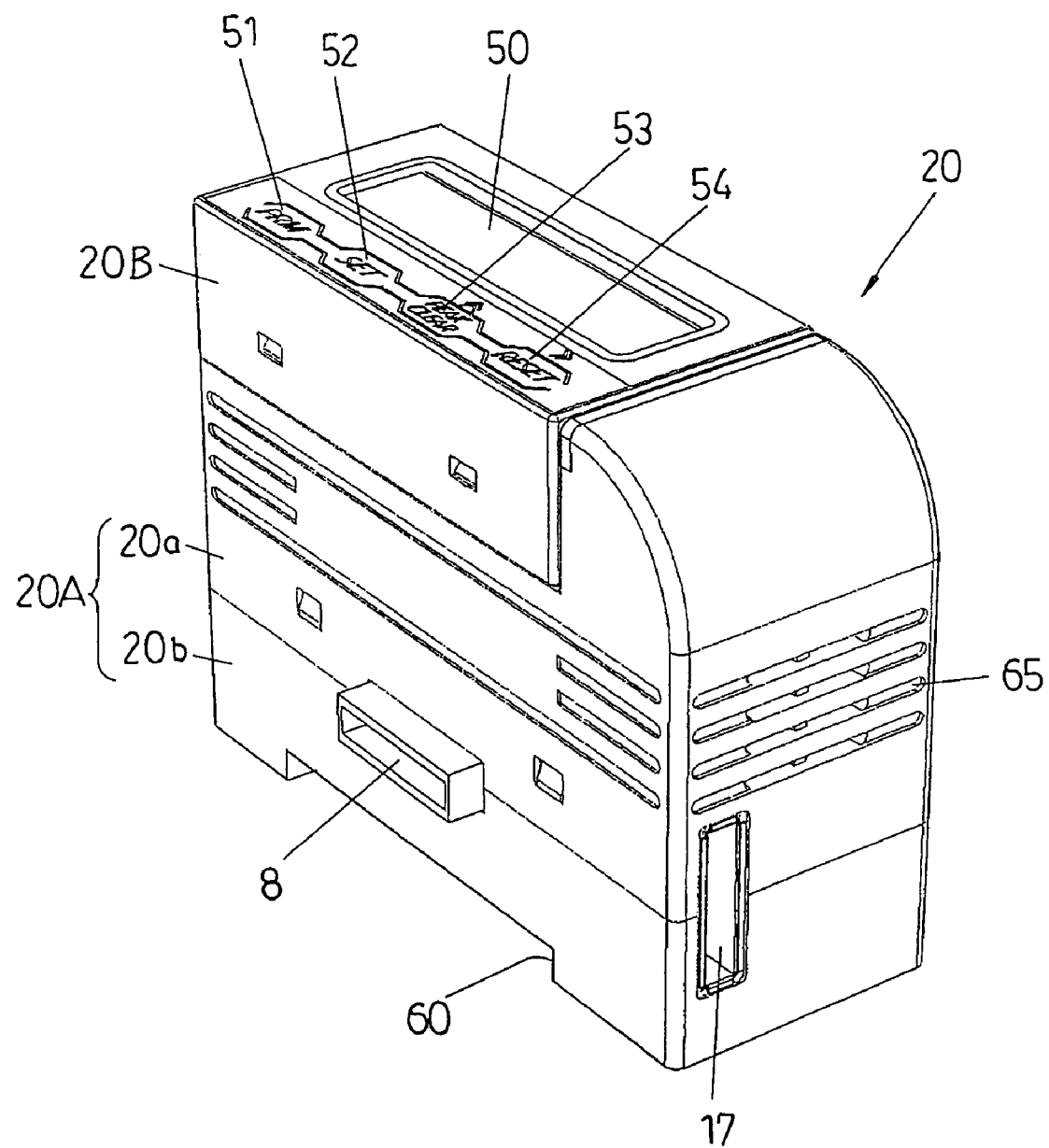
FIG. 14 is similarly a perspective view showing an example of an outer appearance of the child device.

FIG. 11 is a perspective view showing an example of the outer appearance of the measurement electronic device unit 10 as the parent device, FIG. 12 is a perspective view showing a state where the display unit thereof is detached from the main body, and FIG. 13 is a perspective view of the parent device shown in FIG. 11 when it is seen from the opposite side in a longitudinal direction. FIG. 14 is a perspective view showing the outer appearance of the measurement electronic device unit 20 as the child device when it is seen from its side coupled to the parent device.

In these drawings, the same reference codes are used to designate the parts that have been described hitherto, and they are only described simply or not described. The parent device and the child device have substantially the same shape and structure, and therefore, what are common to them will be described together.

Each of the parent device and child device is comprised of a main body 10A or 20A and a display unit 10B or 20B, and the display unit 10B, 20B is attachable/detachable to/from the main body 10A, 20A. In each of the parent device and the child device, the main body 10A, 20A is constituted of an upper unit 10a, 20a and a lower unit 10b, 20b that are integrated by fitting.

Pairs of locking hooks stand on an upper portion of the lower unit 10b, 20b, being arranged along a front face and a rear face thereof respectively, and they are hooked in pairs of locking holes 62 formed in a front face and a rear face of the upper unit 10a, 20a to integrally hold the upper unit 10a, 20a and the lower unit 10b, 20b.

In a bottom face of the lower unit 10b, 20b, a mounting groove 60 passing therethrough in a width direction and a mounting groove 67 passing therethrough in a longitudinal direction are formed, and protrusions, though not shown, for catching rail portions of a later-described DIN rail extend along lower edges of both inner side faces of the mounting groove 60, one of the protrusions being biased toward a protruding direction by a spring and being pushable inward against this biasing force.

Further, as is clearly shown especially in FIG. 12, pairs of locking hooks 63 also stand on an upper portion of the upper unit 10a, 20a of the main body 10A, 20A, being arranged along a front face and a rear face thereof, and pairs of locking holes 64 are formed at positions, corresponding the pair of locking hooks 63, in a front face and a rear face of the display unit 10B, 20B. In addition, a fitting frame 66 is formed along a peripheral edge of an upper face of the upper unit 10a, 20a.

As shown in the drawings except FIG. 12, when the display unit 10B, 20B is attached to the main body 10A, 20A, a lower edge portion of the outer periphery of the display unit 10B, 20B is fitted in the fitting frame 66 of 10a, 20a, and the locking hooks 63 of the upper unit 10a, 20a are locked in the locking holes 64 of the display unit 10B, 20B to integrally hold the both. A large number of ventilation slits 65 are formed in a peripheral surface of a casing of the upper unit 10a, 20a.

As shown in FIG. 12, the connector 18 (pins and pin holes are omitted in the drawing) corresponding to the display unit interface 180 shown in FIG. 3 and FIG. 4 is provided on the upper face of the upper unit 10a, 20a of the main body 10A, 20A, and a connector (a connector 19 shown in FIG. 17) similarly corresponding to the display unit interface 190 is provided on a lower face of the display unit 10B, 20B. When the display unit 10B, 20B is attached to the main body 10A, 20A, these connectors 18 and 19 are fitted to each other so that the display unit interfaces 180 and 190 are coupled together.

Even when the display unit 10B, 20B is in a detached state from the main body 10A, 20A, it is possible to electrically connect the both connectors 18 and 19 by connecting a connection line (cable) between the connectors 18 and 19, so that the display unit interface 180 on the main body side and the display unit interface 190 on the display unit side can be connected.

As shown in FIG. 13, the female connector 6 corresponding to the external device interface 60 is provided in the front face (one of two faces with a larger area to which the child device is not coupled is called the front face and the other face to which the child device is coupled is called the rear face) of the main body 10A of the parent device, and as shown in FIG. 12, the female connector 7 corresponding to the downstream device interface 70 is provided on the rear face thereof.

Further, as shown in FIG. 11 and FIG. 12, the female connector 17 corresponding to the external device interface 170 and a power connector 30 for connection to the power line are provided on one side face of the main body 10A of the parent device, and as shown in FIG. 13, the connector 9 corresponding to the detector interface 90 is provided on the opposite side face.

In the main body 20A of the child device, assuming that a face coupled to the parent device or the upstream child device is the front face and the opposite face is the rear face, the female connector 7 for downstream device, the female connector 17 for external device, and the connector 9 for detector are provided on the rear face and both side faces, as in the main body 10A of the parent device, but the power connector 30 is not provided (see FIG. 14). As shown in FIG. 14, the male connector 8 corresponding to the upstream device interface 80 is provided on the front face.

As shown in FIG. 11 to FIG. 14, the liquid crystal display panel 50 and the operation keys 51 to 54 are provided on the upper face of the display unit 10B, 20B. Display modes by the display panel 50 include a data display mode in which measured values (calculated value) are displayed and a parameter input mode in which a screen for input of set values such as the multiplication value and the division value in the operation parameters shown in FIG. 1 is displayed.

The keys 51 to 54 will be described with reference to FIG. 14, which gives an easy-to-see view thereof. The key 51 (displayed as PRM) is a key for display mode change, and each pressing of this key 51 changes the display mode to/from the data display mode from/to the parameter input mode alternately. The key 52 (displayed as SET) is a key for setting values inputted in the parameter input mode.

The key 53 (displayed as PEAK CLEAR and an upward arrow) and the key 54 (displayed as RESET and a rightward arrow) are keys each having two kinds of functions, and in the data display mode, the key 53 is a key for clearing the peak hold value and the key 54 is a key for clearing and resetting all the storage of the measured values. On the other hand, in the parameter input mode, each pressing of the key 53 increments a numerical value and the numerical value returns to its original value after one round. Each pressing of the key 54 shifts the digit of an inputted numerical value.

Therefore, for setting the operation parameters, the mode is changed to the parameter input mode with the key 51 so that the screen for parameter input is displayed on the display panel 50, and pressing of the key 52 after necessary numerical values are inputted with the keys 53, 54 determines the setting of the numerical values.

Next, a method of mounting the measurement electronic device system according to this invention will be described.

Figure 15:
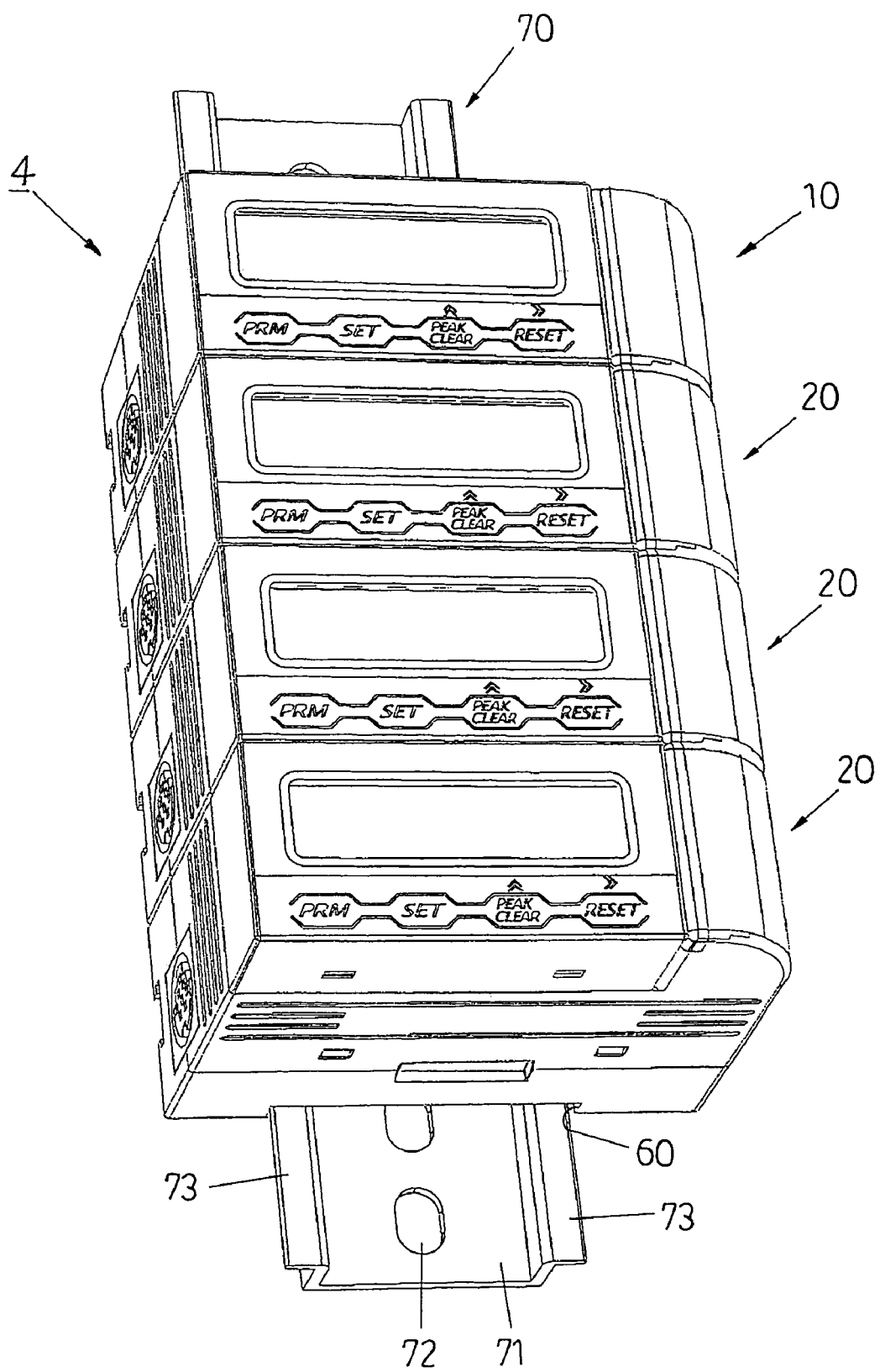
FIG. 15 is a perspective view showing how the measurement electronic device system according to the invention is mounted on a base by using a DIN rail.

FIG. 15 is a perspective view showing how the measurement electronic device system according to the invention is mounted on a base by using a DIN rail.

A DIN rail 70, which is a slender channel-shaped member made of a pressed metal plate, is structured such that portions on both sides of a bottom portion 71 stand at a right angle, and upper portions thereof bend outward again at a right angle to form a pair of rail portions 73, 73 parallel to the bottom face portion 71. In a center portion of the bottom face portion, a plurality of elliptical openings 72 are formed along a longitudinal direction at predetermined intervals Fixing screws are inserted into the elliptical openings 72 to fix the DIN rail 70 to the not-shown base by screwing. Then, as shown in FIG. 15, the measurement electronic device system 4 in which the measurement electronic device unit 10 as the parent device and the plural measurement electronic device units 20 as the child devices are coupled in series can be easily mounted as shown in the drawing in such a manner that the mounting grooves 60 of the respective units are fitted to one of the rail portions 73 of the DIN rail 70, which is then fitted in while pushing the protrusions provided on one of the inner side faces of the fixing groove 60 against the biasing force of the springs, and the fixing groove 60 is also fitted to the other rail portion 73 of the DIN rail 70. The number of the coupled measurement electronic device units 20 as the child devices can be increased/decreased as desired.

Figure 16:
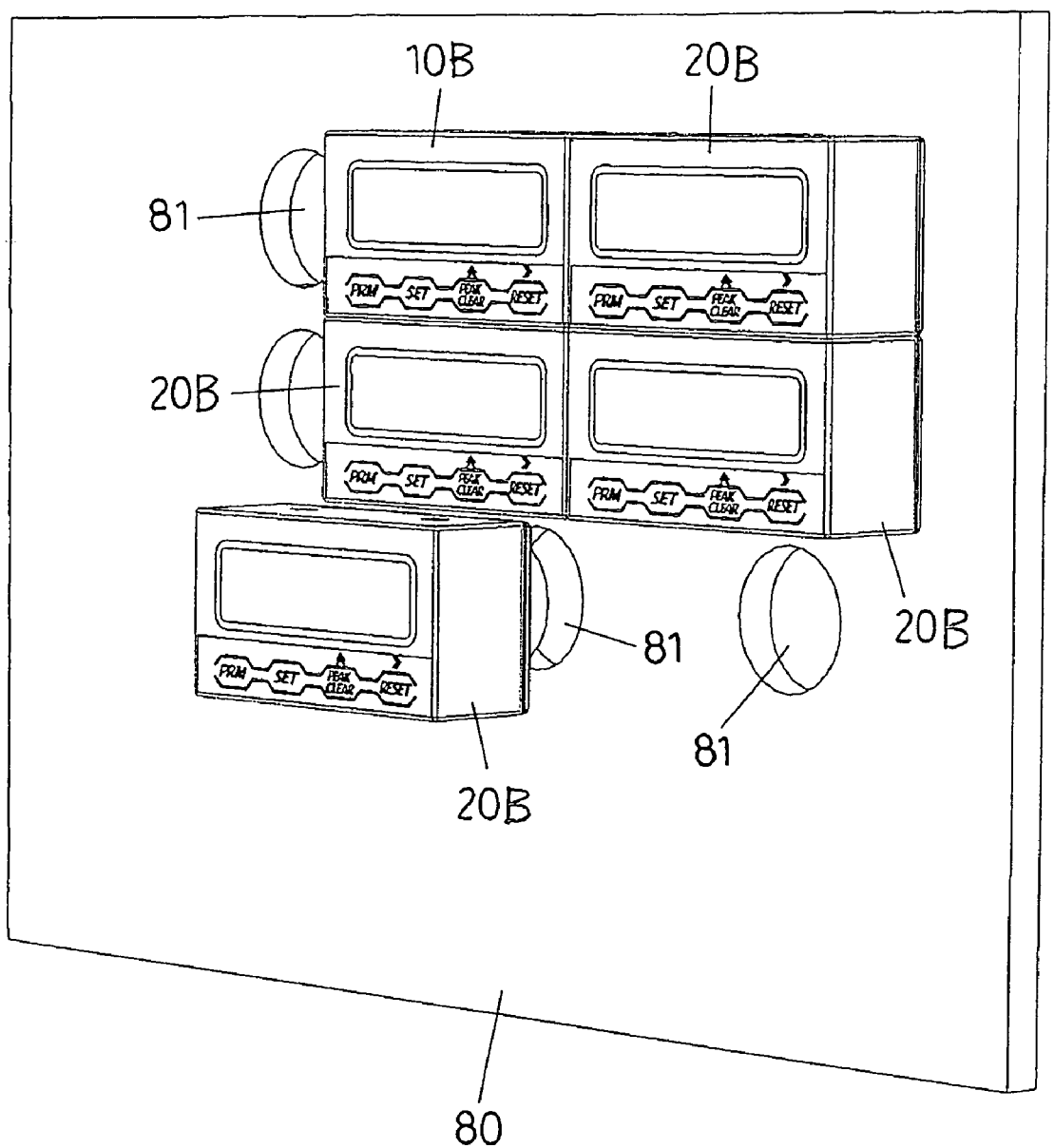
FIG. 16 is a perspective view showing a state in which display units of the plural measurement electronic device units constituting the measurement electronic device system according to the invention are detached from the main bodies and attached to a support board.

FIG. 16 is a perspective view showing a state in which the display units of the plural measurement electronic device units constituting the measurement electronic device system according to the invention are detached from the main bodies to be attached to a support board.

In this case, the main bodies 10A, 20A of the measurement electronic device unit 10 as the parent device and the plural measurement electronic device units 20 as the child devices coupled thereto, which constitute the measurement electronic device system 4, can be mounted on a base, using the DIN rail 70 as in the mounting example shown in FIG. 15.

The display units 10B, 20B are detached from the main bodies 10A, 20A of the respective units and they are attached on a support board 80 made of, for example, an iron plate, being arranged in a plurality of arrays. A large number of mounting window holes 81 are formed in lines in the support board 80, and by using these mounting window holes 81, the display units 10B, 20B are attached to the support board 80 with attachments and nuts shown in FIG. 17 and FIG. 18.

As shown in FIG. 17, an attachment board 58 having an integrally formed screw portion 59 is fixed to the rear face (lower face in FIG. 11 to FIG. 14) of the display unit 10B with a not-shown screw or the like. The screw portion 59 is in a cylindrical shape and has a male thread formed on an outer peripheral surface thereof, and the inside thereof does not overlap the connector 19 provided in the center portion of the rear face of the display unit 10B, so that a connector of a connection line to the main body 10A can be attached to the connector 19.

Then, as shown in FIG. 18, the screw portion 59 is inserted in the mounting window hole 81 from a front side of the support board 80, and the nut 90 is screwed to the screw portion 59 protruding to the rear face of the support board 80, whereby the display unit 10B with the attachment board 58 fixed thereto is fastened and fixed to the support board 80. The display unit 20B of the child device is also attached to the support board 80 in the completely the same manner.

Then, when the connector 19 of the display unit 10B, 20B and the connector 18 (see FIG. 12) of the main body 10A, 20A are connected to each other by the connection line, they function in the same manner as when the display unit 10A, 20A are integrally attached to the main body 10A, 20A. Moreover, this is advantageous in that the displays of the respective units are easy to see, which facilitates setting of the operation parameters by key operation.

However, the shape of the outer appearance and the mounting method described above are shown only as an example, and it goes without saying that various changes can be made thereto.

INDUSTRIAL APPLICABILITY

As has been described hitherto, the use of the measurement electronic device system according to the invention makes it possible to enhance simultaneity of measurement and obtain highly reliable measurement results in measuring a changing object by detectors of a plurality of measurement electronic device units.

Moreover, it is possible to facilitate positioning through zero resetting in measurement using a plurality of sets of measurement electronic device units. Further, arithmetic processing on measured values simultaneously measured by a plurality of measuring instruments can be made simple and free of mistake.

The invention claimed is:

1. A measurement electronic device system comprising:
  a plurality of measurement electronic device units each having a measurement detector connected thereto and having a measuring function, the plural measurement electronic device units being connected in series by connectors to be capable of mutually conveying measurement data and signals, and one of the plural measurement electronic device units serving as a parent device having a function of transmitting/receiving measurement data and signals to/from an external device,
  wherein each of said plural measurement electronic device units has a memory storing a measured value, and said parent device has a means for issuing a one-time measured value save command to said plural measurement electronic device units including said parent device, in response to a request from the external device, to thereby cause said plural measurement electronic device units to simultaneously store in the respective memories the current values being measured by the respective detectors at the time of issuance of the one-time measured value save command.

2. The measurement electronic device system according to claim 1,
  wherein said measurement electronic device unit serving as the parent device has a means for causing all said measurement electronic device units including said parent device which are connected in series to save the measured values by the respective detectors in the memories, also in response to an externally supplied measured value save command.

3. The measurement electronic device system according to claim 2,
  wherein said measurement electronic device unit serving as the parent device has a means for selectively changing connection of a signal line connected to the other measurement electronic device units to one of a signal line from an external device and a signal line of an internal output.

4. The measurement electronic device system according to claim 2,
  wherein each of said measurement electronic device units except the parent device has a means for disconnecting mutually coupled signal lines to change connection to a signal line from an external part.

5. The measurement electronic device system according to claim 2,
  wherein each of said plural measurement electronic device units includes: a storing means for storing an operation parameter; and an arithmetic means for performing an arithmetic operation on the measured value saved in the memory, based on the parameter stored in the storing means.

6. The measurement electronic device system according to claim 5,
  wherein said measurement electronic device unit serving as the parent device further includes a sum calculating means for calculating a sum of individual operation results calculated by the arithmetic means in the measurement electronic device units designated out of said plural measurement electronic device units.

7. The measurement electronic device system according to claim 2, wherein each of said plural measurement electronic device units comprises:

a main body housing the connector for mutual series connection and said memory storing a measured value; and a display unit attachable/detachable to/from the main body, the display unit including: a display displaying the measured value; and operation keys, and the main body and the display unit including connectors that directly connect the main body and the display unit mechanically and electrically when the display unit is attached to the main body and that allow the main body and the display unit to be electrically connected via a connecting line when the display unit is detached from the main body.

8. The measurement electronic device system according to claim 1, wherein said measurement electronic device unit serving as the parent device has a means for selectively changing connection of a signal line connected to the other measurement electronic device units to one of a signal line from an external device and a signal line of an internal output.

9. The measurement electronic device system according to claim 8, wherein each of said measurement electronic device units except the parent device has a means for disconnecting mutually coupled signal lines to change connection to a signal line from an external part.

10. The measurement electronic device system according to claim 8, wherein each of said plural measurement electronic device units includes: a storing means for storing an operation parameter; and an arithmetic means for performing an arithmetic operation on the measured value saved in the memory, based on the parameter stored in the storing means.

11. The measurement electronic device system according to claim 10, wherein said measurement electronic device unit serving as the parent device further includes a sum calculating means for calculating a sum of individual operation results calculated by the arithmetic means in the measurement electronic device units designated out of said plural measurement electronic device units.

12. The measurement electronic device system according to claim 8, wherein each of said plural measurement electronic device units comprises:

a main body housing the connector for mutual series connection and said memory storing a measured value; and a display unit attachable/detachable to/from the main body, the display unit including: a display displaying the measured value; and operation keys, and the main body and the display unit including connectors that directly connect the main body and the display unit mechanically and electrically when the display unit is attached to the main body and that allow the main body and the display unit to be electrically connected via a connecting line when the display unit is detached from the main body.

13. The measurement electronic device system according to claim 1, wherein each of said measurement electronic device units except the parent device has a means for disconnecting mutually coupled signal lines to change connection to a signal line from an external part.

14. The measurement electronic device system according to claim 13, wherein each of said plural measurement electronic device units includes: a storing means for storing an operation parameter; and an arithmetic means for performing an arithmetic operation on the measured value saved in the memory, based on the parameter stored in the storing means.

15. The measurement electronic device system according to claim 14, wherein said measurement electronic device unit serving as the parent device further includes a sum calculating means for calculating a sum of individual operation results calculated by the arithmetic means in the measurement electronic device units designated out of said plural measurement electronic device units.

16. The measurement electronic device system according to claim 1, wherein each of said plural measurement electronic device units includes: a storing means for storing an operation parameter; and an arithmetic means for performing an arithmetic operation on the measured value saved in the memory, based on the parameter stored in the storing means.

17. The measurement electronic device system according to claim 16, wherein said measurement electronic device unit serving as the parent device further includes a sum calculating means for calculating a sum of individual operation results calculated by the arithmetic means in the measurement electronic device units designated out of said plural measurement electronic device units.

18. The measurement electronic device system according to claim 17, wherein each of said plural measurement electronic device units comprises:

a main body housing the connector for mutual series connection and said memory storing a measured value; and a display unit attachable/detachable to/from the main body, the display unit including: a display displaying the measured value and the parameter; and operation keys, and the main body and the display unit including connectors that directly connect the main body and the display unit mechanically and electrically when the display unit is attached to the main body and that allow the main body and the display unit to be electrically connected via a connecting line when the display unit is detached from the main body.

19. The measurement electronic device system according to claim 16, wherein each of said plural measurement electronic device units comprises:

a main body housing the connector for mutual series connection and said memory storm a measured value; and a display unit attachable/detachable to/from the main body, the display unit including: a display displaying the measured value and the parameter; and operation keys, and the main body and the display unit including connectors that directly connect the main body and the display unit mechanically and electrically when the display unit is attached to the main body and that allow the main body and the display unit to be electrically connected via a connecting line when the display unit is detached from the main body.

20. The measurement electronic device system according to claim 1, wherein each of said plural measurement electronic device units comprises:

a main body housing the connector for mutual series connection and said memory storing a measured value; and
a display unit attachable/detachable to/from the main body, the display unit including: a display displaying the measured value; and operation keys, and the main body and the display unit including connectors that directly connect the main body and the display unit mechanically and electrically when the display unit is attached to the main body and that allow the main body and the display unit to be electrically connected via a connecting line when the display unit is detached from the main body.

* * * * *